US011406972B2

(12) United States Patent
Blackwell et al.

(10) Patent No.: US 11,406,972 B2
(45) Date of Patent: Aug. 9, 2022

(54) ACTIVATION OF PROTECTED CROSS-LINKING CATALYSTS DURING FORMATION OF DIELECTRIC MATERIALS

(71) Applicant: Intel Corporation, Santa Clara, CA (US)

(72) Inventors: James M. Blackwell, Portland, OR (US); David J. Michalak, Portland, OR (US); Jessica M. Torres, Portland, OR (US); Marie Krysak, Portland, OR (US); Jeffery D. Bielefeld, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 15/772,839

(22) PCT Filed: Dec. 4, 2015

(86) PCT No.: PCT/US2015/063867
§ 371 (c)(1),
(2) Date: May 2, 2018

(87) PCT Pub. No.: WO2017/095431
PCT Pub. Date: Jun. 8, 2017

(65) Prior Publication Data
US 2018/0236440 A1 Aug. 23, 2018

(51) Int. Cl.
*B01J 37/08* (2006.01)
*H01B 3/46* (2006.01)
(Continued)

(52) U.S. Cl.
CPC ............. *B01J 37/08* (2013.01); *B01J 21/02* (2013.01); *B01J 31/0284* (2013.01); *C08J 3/245* (2013.01);
(Continued)

(58) Field of Classification Search
None
See application file for complete search history.

(56) References Cited

U.S. PATENT DOCUMENTS

| | | |
|---|---|---|
| 5,635,250 A | 6/1997 | Blum et al. |
| 6,740,716 B2 | 5/2004 | Webb et al. |

(Continued)

FOREIGN PATENT DOCUMENTS

| | | |
|---|---|---|
| CN | 1249116 C | 4/2006 |
| JP | 2008527077 A | 7/2008 |
| TW | 201243947 A | 11/2012 |

OTHER PUBLICATIONS

Gahnhamsetty et al., "Selective silylative reduction of pyridines leading to structurally diverse azacyclic compounds with the formation of sp3 C—Si bonds", Journal of the American Chemical Society, vol. 137, No. 48, pp. 15176-15184, Nov. 2015.
(Continued)

*Primary Examiner* — Stefanie J Cohen
(74) *Attorney, Agent, or Firm* — Patent Capital Group

(57) ABSTRACT

Catalysts for facilitating cross-linking of liquid precursors into solid dielectric materials are disclosed. Initially, catalysts are protected, either by coordination with other compounds or by conversion to an ionic salt. Protection prevents catalysts from facilitating cross-linking unless activated. A catalyst is activated upon receiving an excitation, e.g. thermal excitation by heating. Upon receiving an excitation, protection of a catalyst dissociates, decomposes, becomes neutralized, or is otherwise transformed to allow the catalyst to facilitate cross-linking of the precursors into solid dielectric materials. Methods for fabricating dielectric materials using such protected catalysts as well as devices comprising the resulting materials are also described. Dielectric materials comprising cross-linked cyclic carbosilane units having a ring structure including C and Si may be formed in this
(Continued)

manner. Protected catalysts disclosed herein allow careful control of precursor cross-linking, resulting in higher quality dielectric materials that may be formed by coating techniques.

9 Claims, 13 Drawing Sheets

(51) Int. Cl.
- *H01B 3/22* (2006.01)
- *B01J 21/02* (2006.01)
- *B01J 31/02* (2006.01)
- *C08J 3/24* (2006.01)
- *C08L 83/16* (2006.01)

(52) U.S. Cl.
CPC ............. *C08L 83/16* (2013.01); *H01B 3/22* (2013.01); *H01B 3/46* (2013.01)

(56) References Cited

U.S. PATENT DOCUMENTS

| | | | |
|---|---|---|---|
| 7,148,370 B1 * | 12/2006 | Rubinsztajn | C07F 7/0874 |
| | | | 556/469 |
| 7,157,052 B1 * | 1/2007 | McGill | C08G 77/60 |
| | | | 422/69 |
| 7,732,543 B2 | 6/2010 | Loch et al. | |
| 8,441,006 B2 | 5/2013 | Michalak et al. | |
| 2003/0120005 A1 | 6/2003 | Webb et al. | |
| 2007/0298223 A1 | 12/2007 | Loch et al. | |
| 2012/0161295 A1 | 6/2012 | Michalak et al. | |
| 2013/0249049 A1 | 9/2013 | Michalak et al. | |
| 2014/0004358 A1 * | 1/2014 | Blackwell | B05D 3/007 |
| | | | 428/447 |
| 2016/0351401 A1 * | 12/2016 | Ba | H01L 21/28562 |

OTHER PUBLICATIONS

International Preliminary Report on Patentability issued in PCT Application No. PCT/US2015/063867 dated Jun. 14, 2018 (7 pages).
International Search Report and Written Opinion issued in PCT Application No. PCT/US2015/063867 dated Aug. 10, 2016; 8 pages.
Kung et al., "Organosilicon platforms: bridging homogeneous, heterogeneous, and bioinspired catalysis", Chemical Communications, vol. 50, pp. 3262-3276 (2014).

* cited by examiner

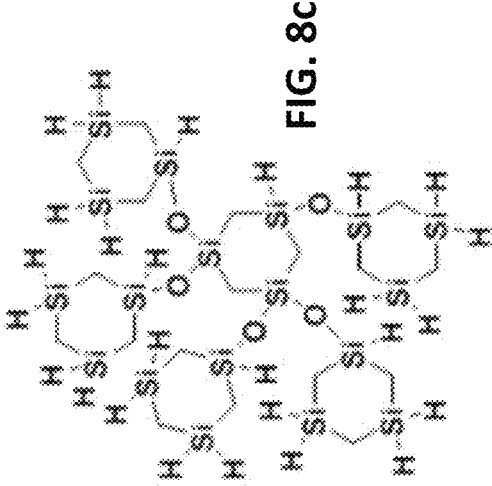
FIG. 8c
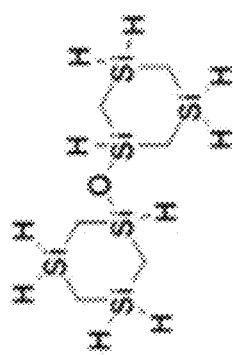
FIG. 8b
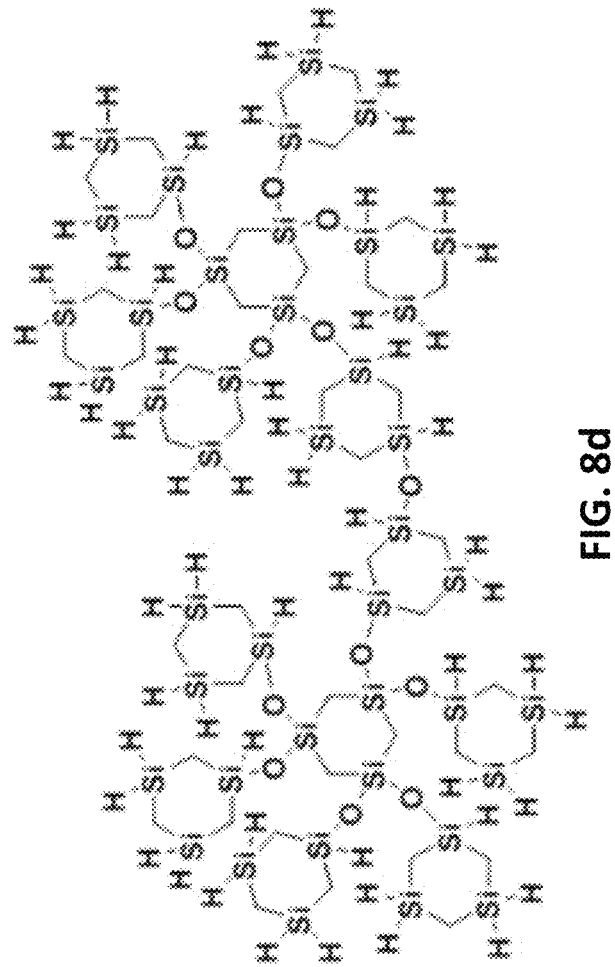
FIG. 8d
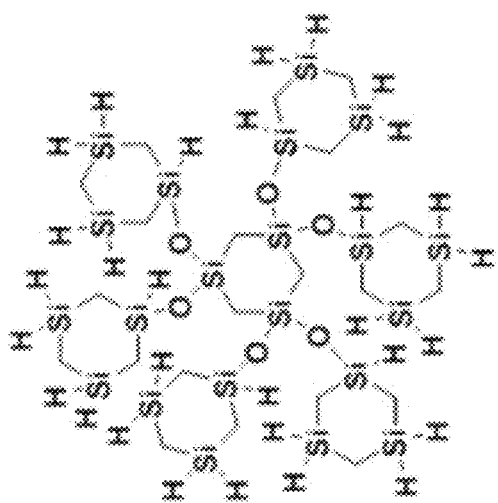
FIG. 8a
FIG. 8e

US 11,406,972 B2

ACTIVATION OF PROTECTED CROSS-LINKING CATALYSTS DURING FORMATION OF DIELECTRIC MATERIALS

CROSS-REFERENCE TO RELATED APPLICATIONS

This application is a national stage application under 35 U.S.C. § 371 of PCT International Application Serial No. PCT/US2015/063867, filed on Dec. 4, 2015 and entitled "ACTIVATION OF PROTECTED CROSS-LINKING CATALYSTS DURING FORMATION OF DIELECTRIC MATERIALS," which is hereby incorporated by reference in its entirety.

TECHNICAL FIELD

This disclosure relates generally to the field of integrated circuits and semiconductor manufacturing, and more specifically, to activation of protected cross-linking catalysts during formation of porous and non-porous dielectric materials.

BACKGROUND

For the past several decades, the scaling of features in integrated circuits (ICs) has been a driving force behind an ever-growing semiconductor industry. Scaling to smaller and smaller features enables increased densities of functional units on the limited real estate of semiconductor IC chips. For example, shrinking transistor size allows for the incorporation of an increased number of memory or logic devices on a chip, lending to the fabrication of products with increased capacity.

IC chips are used in a variety of devices including automobiles, computers, appliances, mobile phones and consumer electronics. A plurality of IC chips can typically be formed on a single silicon wafer, i.e. a silicon disk having a diameter of, for example, 300 millimeters (mm), which is then diced apart to create individual chips. IC chips can include features sizes on the nanometer scale and can comprise hundreds of millions of components. Improved materials and manufacturing techniques have reduced features sizes to, for example, less than 45 nanometers (nm).

The drive for the ever-increasing capacity, however, is not without issue. The desire to make smaller IC chips continuously places demands on the methods and materials used to manufacture these devices. In particular, there is a need for fabricating structures with dielectric materials that are characterized by uniformity in their chemical composition and can be formed using coating techniques.

BRIEF DESCRIPTION OF THE DRAWINGS

FIGS. 8a through 8e provide chemical structures of different species that are representative of a cyclic carbosilane oligomer identified as "13a" that can be used in accordance with various embodiments of the present disclosure.

DETAILED DESCRIPTION

Figure 1:
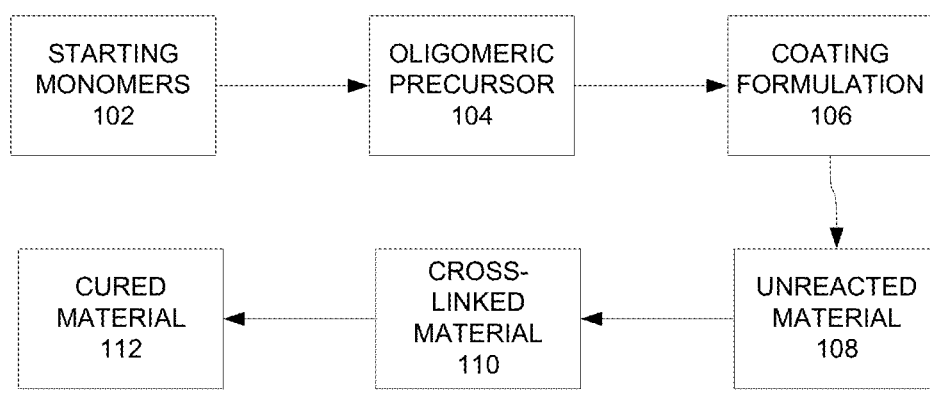
FIG. 1 provides a schematic flow chart illustrating a process of forming a dielectric material by cross-linking precursor formulation, according to some embodiments of the present disclosure.

Catalysts for facilitating cross-linking of liquid precursors into solid dielectric materials are disclosed. Initially, the catalysts are protected, either by coordination with other compounds or by conversion to an ionic salt. Such protection prevents the catalysts from facilitating cross-linking unless they are activated to do so. A catalyst is activated when it receives an excitation, e.g. thermal excitation in a form of heating. Upon receiving an excitation, protection of a catalyst dissociates, decomposes, becomes neutralized, or is otherwise transformed to allow the catalyst to facilitate cross-linking of the precursors into solid dielectric materials. Methods for fabricating dielectric materials using such protected catalysts as well as devices comprising the resulting dielectric materials are also described. Dielectric materials comprising cross-linked cyclic carbosilane units having a ring structure including C and Si may be formed in this manner. Protected catalysts disclosed herein allow careful control of precursor cross-linking, resulting in improved dielectric materials, e.g. in terms of uniformity and surface roughness, that may be formed by coating techniques.

As used herein, the term "coordination" and similar expressions refer to dative bonding of one molecule, e.g. a Lewis base molecule, to another molecule, e.g. a Lewis acid molecule, through donation of an electron pair from the former into an empty orbital of the latter.

In some embodiments, the dielectric material comprises cross-linked cyclic carbosilane units having a ring structure including C and Si, where at least a first cyclic carbosilane unit is linked to at least two, sometimes at least three or at least four, adjacent cyclic carbosilane units. In other embodiments, the dielectric material comprises cross-linked cyclic carbosilane units having a ring structure including C and Si, wherein the cross-linked carbosilane units are capped with Si—H groups or Si—H$_2$ groups.

In the following description, various aspects of the illustrative implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

Implementations of the disclosure may be formed or carried out on a substrate, such as a semiconductor substrate. In one implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. Although a few examples of materials from which the substrate may be formed are described here, any material that may serve as a foundation upon which a semiconductor device may be built falls within the spirit and scope of the present disclosure.

In various embodiments, the interconnects as described herein may be used to connect various components associated with an integrated circuit. Components include, for example, transistors, diodes, power sources, resistors, capacitors, inductors, sensors, transceivers, receivers, antennas, etc. Components associated with an integrated circuit may include those that are mounted on an integrated circuit or those connected to an integrated circuit. The integrated circuit may be either analog or digital and may be used in a number of applications, such as microprocessors, optoelectronics, logic blocks, audio amplifiers, etc., depending on the components associated with the integrated circuit. The integrated circuit may be employed as part of a chipset for executing one or more related functions in a computer.

In the embodiments where at least some of the components associated with an integrated circuit are transistors, a plurality of transistors, such as metal-oxide-semiconductor field-effect transistors (MOSFET or simply MOS transistors), may be fabricated on the substrate. In various implementations of the disclosure, the MOS transistors may be planar transistors, nonplanar transistors, or a combination of both. Nonplanar transistors include FinFET transistors such as double-gate transistors and tri-gate transistors, and wrap-around or all-around gate transistors such as nanoribbon and nanowire transistors. Although the implementations described herein may illustrate only planar transistors, it should be noted that the disclosure may also be carried out using nonplanar transistors.

Each MOS transistor includes a gate stack formed of at least two layers, a gate interconnect support layer and a gate electrode layer. The gate interconnect support layer may include one layer or a stack of layers. The one or more layers may include silicon oxide, silicon dioxide (SiO$_2$) and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate interconnect support layer include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate interconnect support layer to improve its quality when a high-k material is used.

The gate electrode layer is formed on the gate interconnect support layer and may consist of at least one P-type workfunction metal or N-type workfunction metal, depending on whether the transistor is to be a PMOS or an NMOS transistor. In some implementations, the gate electrode layer may consist of a stack of two or more metal layers, where one or more metal layers are workfunction metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, and conductive metal oxides, e.g., ruthenium oxide. A P-type metal layer will enable the formation of a PMOS gate electrode with a workfunction that is between about 4.9 eV and about 5.2 eV. For an NMOS transistor, metals that may be used for the gate electrode include, but are not limited to, hafnium, zirconium, titanium, tantalum, aluminum, alloys of these metals, and carbides of these metals such as hafnium carbide, zirconium carbide, titanium carbide, tantalum carbide, and aluminum carbide. An N-type metal layer will enable the formation of an NMOS gate electrode with a workfunction that is between about 3.9 eV and about 4.2 eV.

In some implementations, when viewed as a cross-section of the transistor along the source-channel-drain direction, the gate electrode may consist of a "U"-shaped structure that includes a bottom portion substantially parallel to the surface of the substrate and two sidewall portions that are substantially perpendicular to the top surface of the substrate. In another implementation, at least one of the metal layers that form the gate electrode may simply be a planar layer that is substantially parallel to the top surface of the substrate and does not include sidewall portions substantially perpendicular to the top surface of the substrate. In further implementations of the disclosure, the gate electrode may consist of a combination of U-shaped structures and planar, non-U-shaped structures. For example, the gate electrode may consist of one or more U-shaped metal layers formed atop one or more planar, non-U-shaped layers.

In some implementations of the disclosure, a pair of sidewall spacers may be formed on opposing sides of the gate stack that bracket the gate stack. The sidewall spacers may be formed from a material such as silicon nitride, silicon oxide, silicon carbide, silicon nitride doped with carbon, and silicon oxynitride. Processes for forming sidewall spacers are well known in the art and generally include deposition and etching process steps. In an alternate implementation, a plurality of spacer pairs may be used, for instance, two pairs, three pairs, or four pairs of sidewall spacers may be formed on opposing sides of the gate stack.

As is well known in the art, source and drain regions are formed within the substrate adjacent to the gate stack of each MOS transistor. The source and drain regions are generally formed using either an implantation/diffusion process or an etching/deposition process. In the former process, dopants such as boron, aluminum, antimony, phosphorous, or arsenic may be ion-implanted into the substrate to form the source and drain regions. An annealing process that activates the dopants and causes them to diffuse further into the substrate typically follows the ion implantation process. In the latter process, the substrate may first be etched to form recesses at the locations of the source and drain regions. An epitaxial deposition process may then be carried out to fill the recesses with material that is used to fabricate the source and drain regions. In some implementations, the source and drain regions may be fabricated using a silicon alloy such as silicon germanium or silicon carbide. In some implementations the epitaxially deposited silicon alloy may be doped in situ with dopants such as boron, arsenic, or phosphorous. In further embodiments, the source and drain regions may be formed using one or more alternate semiconductor materials such as germanium or a group III-V material or alloy. And in further embodiments, one or more layers of metal and/or metal alloys may be used to form the source and drain regions.

One or more interlayer dielectrics may be deposited over the MOS transistors. The ILD layers may be formed using dielectric materials known for their applicability in integrated circuit structures, such as dielectric materials. Examples of dielectric materials that may be used include, but are not limited to, silicon dioxide ($SiO_2$), carbon doped oxide (CDO), silicon nitride, organic polymers such as perfluorocyclobutane or polytetrafluoroethylene, fluorosilicate glass (FSG), and organosilicates such as silsesquioxane, siloxane, or organosilicate glass. The ILD layers may include pores or air gaps to further reduce their dielectric constant.

In general, a low-k dielectric material is a dielectric material that has a lower dielectric constant (k) than silicon dioxide ($SiO_2$). Silicon dioxide has a dielectric constant of 3.9. The use of dielectric materials in integrated circuit devices has enabled continued device size reduction. Although a variety of materials have lower dielectric constants than $SiO_2$ not all materials are suitable for integration into integrated circuits and integrated circuit manufacturing processes. Embodiments of the present disclosure are particularly suitable for forming low-k dielectric materials with k being less than 3.9. However, teachings provided herein are also applicable to dielectric materials with k higher than that of $SiO_2$, e.g. to carbosilane-based dielectric materials having k that is in the range of 3.9-4.1. Materials with a k-value higher than 3.9 are useful for a number of applications, specifically ones where the higher k material would also bring unusual properties such as e.g. different etch rate relative to $SiO_2$, allowing the material to be uniquely etched in a given etch chemistry/condition.

In general, an interlayer dielectric (ILD) or inter metal dielectric (IMD) film is the insulating material used between metal conductors and devices (such as transistors) in integrated circuit devices.

To provide context, conventionally, fabrication techniques used for integrating advanced interconnects require dielectric materials with unique compositions. Preferably, such dielectric materials can be formed from precursors using coating techniques, such as e.g. spin-coating, chemical vapor deposition (CVD), or similar techniques. After a precursor is coated on a substrate, precursor cross-links to form a solid dielectric material. A typical process is schematically illustrated in FIG. 1 as a process 100. The process may start with reacting one or more types of starting monomers (box 102), such as e.g. cyclic carbosilane monomers described in greater detail below, to form an oligomeric precursor. Typically a catalyst is used to facilitate cross-linking of monomers into oligomers of the precursor. As a result, an oligomeric precursor is formed (box 104). Next, a precursor formulation (i.e. coating formulation) is formed (box 106) by adding to the oligomeric precursor various additives, solvents, and/or porogens in order to fine-tune coating properties and process, as well as fine tune properties of the resulting dielectric material. The coating formulation is then coated onto a substrate, e.g. by means of spin-coating, resulting in unreacted precursor material being provided on the substrate (box 108). In this context, "unreacted" refers to the fact that the precursors are not yet cross-linked into a solid dielectric material. Such an approach may be used both for forming blanket or bulk films of dielectric materials by coating a substrate that is substantially planar or a substrate that includes relatively large features, as well as for filling nanostructures formed in a substrate, e.g. openings or gaps with dimensions on the order of nanometers or tens of nanometers, with dielectric materials. Next, excitation, such as e.g. thermal or/and optical excitation, is applied to cross-link the precursor coated on the substrate into a solid dielectric material (box 110). After that, optionally but preferably, a curing step is applied (box 112) to further cross-link, harden, and/or outgas the solid dielectric material. For the cross-linking of box 110, typically a low temperature bake or photochemical activation is used, while for the curing of box 112, typically high temperature bake or ultraviolet (UV) cure is used.

One problem with the approach described above is that resulting dielectric materials exhibit non-uniform cross-linking and material properties depending on both the depth in the resulting film and whether the material is within a patterned feature or in a bulk/blanket form. Non-uniformity may come from the requirement for $O_2$ or $H_2O$ to diffuse into films during the baking process(es). Film roughening can also be observed if film is not locked in place with significant cross-linking prior to higher temperature bakes required in processing. Non-uniformity may also result from the catalysts remaining from the oligomer synthesis process continuing to act, prematurely cross-linking parts of the precursor into a solid material.

As the foregoing illustrates, it would be desirable to have a better control of the cross-linking process for forming solid dielectric films in terms of controlling when the cross-linking starts and at which conditions cross-linking takes place, and in terms of forming dielectric materials that are more uniform. Uniformity can be improved both in terms of the chemical composition of the dielectric materials (e.g. material properties are more uniform) and their distribution on or/and within the substrate (e.g. thickness is more uniform).

In order to improve on one or more of the challenges described above, novel cross-linking catalysts for facilitating cross-linking of liquid oligomeric precursors into solid dielectric materials are disclosed. Embodiments of the present disclosure are based on a recognition that, often times, great efforts have to be taken in order to prevent existing precursor formulations from starting to cross-link prematurely. For example, existing precursor formulations need to be kept at low temperatures or/and away from light. Embodiments of the present disclosure are further based on an insight that providing cross-linking catalysts, i.e. compounds that facilitate cross-linking of oligomeric precursors into solid dielectric materials, that are initially protected with compounds that ensure that the catalysts do not facilitate cross-linking until activated to do so, allows better control over the cross-linking process. Activation may occur by means of thermal or optical excitation. Introducing cross-linking catalysts in a protected form allows avoiding unwanted reactions in formulation and allows initiating cross-linking reactions once the precursor has been deposited on or into the substrate and in controlled conditions (i.e. when activated), e.g. as a predefined temperature in reached to activate the catalyst.

Figure 2A:
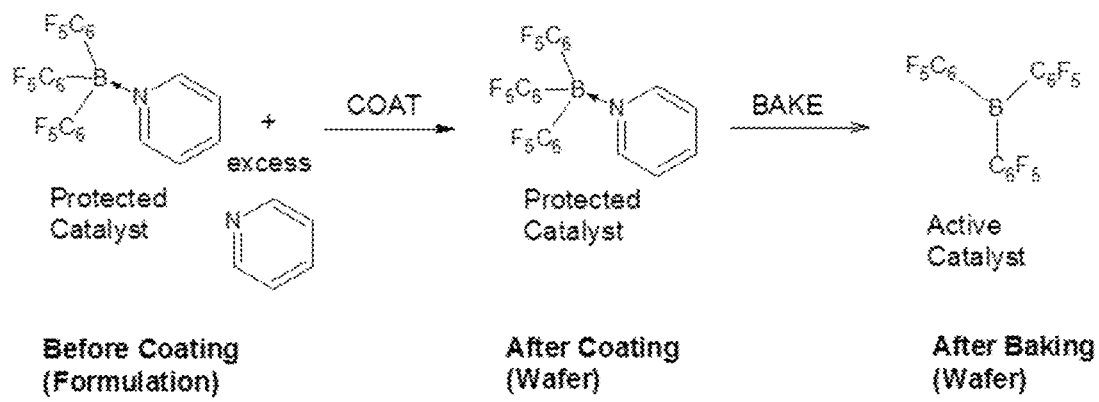
FIGS. 2a and 2b provide chemical structures for protected catalysts, according to various embodiments of the present disclosure.
Figure 2B:
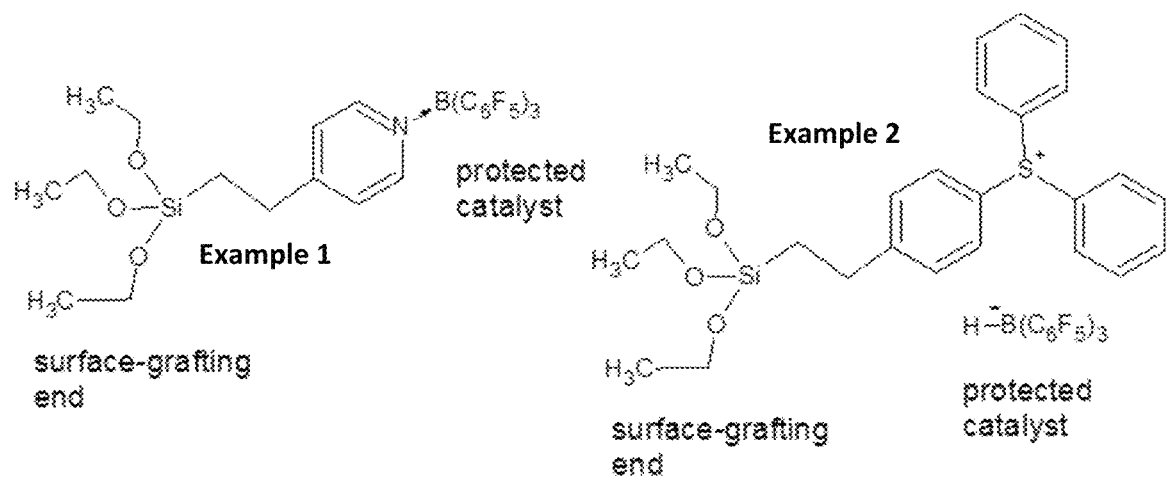
Figure 3:
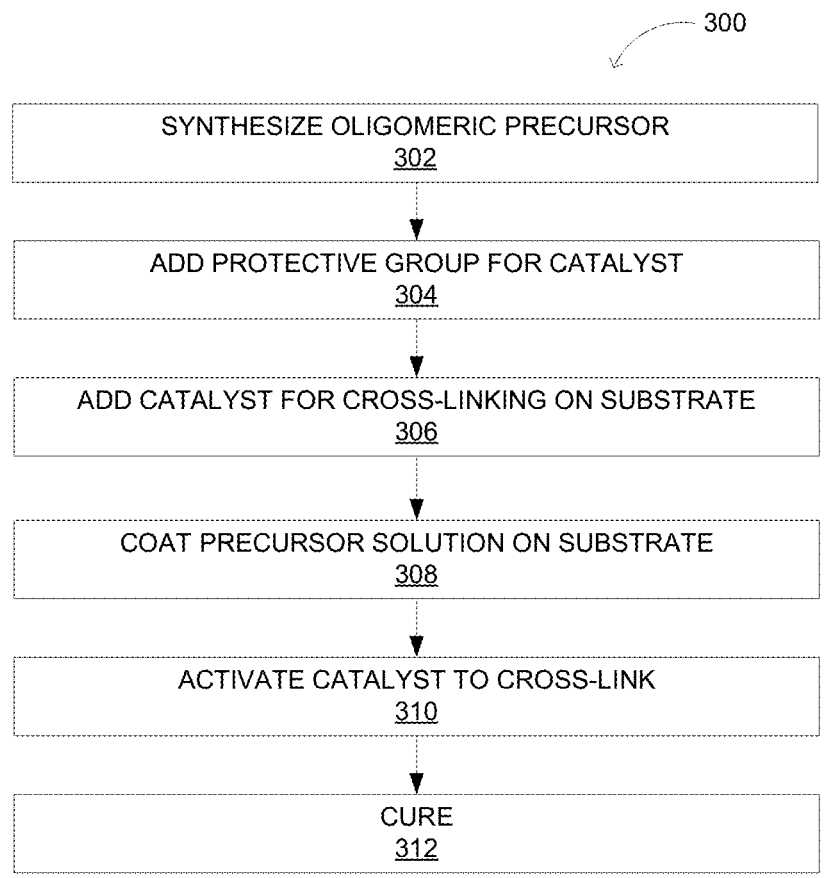
FIG. 3 provides a schematic flow chart illustrating a process of forming a dielectric material using a precursor formulation that contains protected catalysts, according to some embodiments of the present disclosure.
Figure 4:
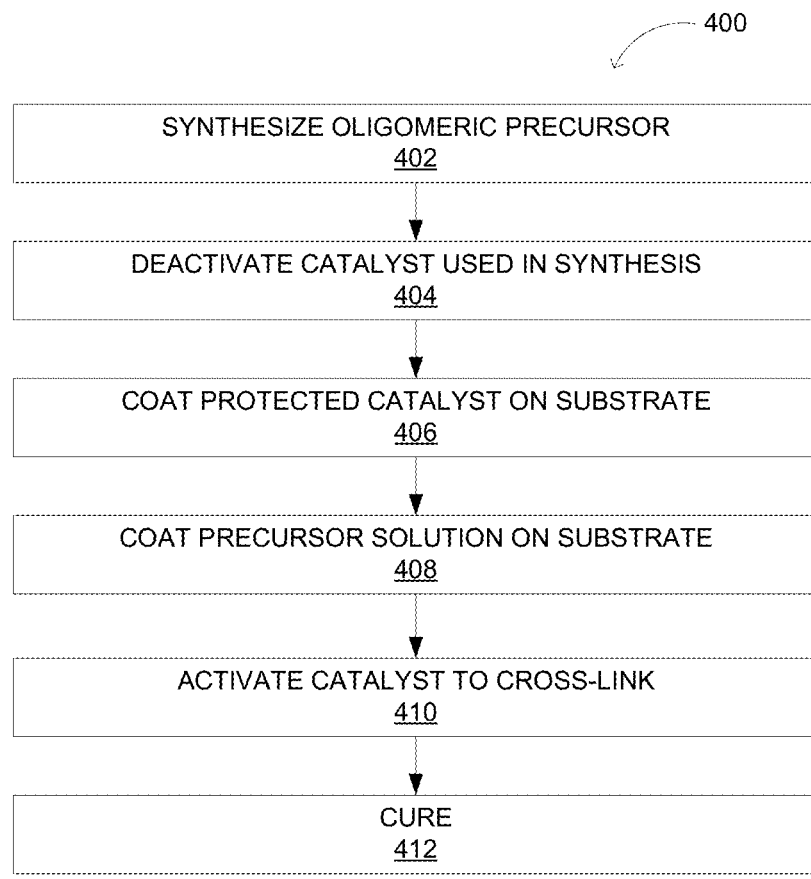
FIG. 4 provides a schematic flow chart illustrating a process of forming a dielectric material using pre-coating of protected catalysts, according to some embodiments of the present disclosure.

In various embodiments of the present disclosure, protected catalysts described herein (examples of which are shown in FIGS. 2a and 2b) may be introduced as a part of the initial coating formulation, i.e. along with the precursors (as shown in FIG. 3) or as a pre-coating (as shown in FIG. 4). A combination of these embodiments is also possible, where protected catalysts are introduced both as a part of the initial coating formulation, and as pre-coating, where the same or different protected catalysts may be used for each of these purposes.

Processing required for forming dielectric materials using such protected cross-linking catalysts is expected to be superior to known approaches in terms of cost and processing simplicity. Advantageously, dependence of the uniformity of the final dielectric material on uniform incorporation of external cross-linker may be reduced or eliminated.

In some embodiments, use of the protected catalysts described herein allows reducing surface roughness of the resulting dielectric material so that a thickness of the dielectric film varies less than 10 percent of the average thickness.

In some embodiments, use of the protected catalysts described herein improves uniformity in terms of porosity of a resulting porous dielectric material so that the pore radius is in the range of 1-10 nm. In some embodiments, the pore radius may vary less than 10-20% percent of the average pore radius.

In some embodiments, use of some of the protected catalysts described herein results in the final dielectric material comprising boron in concentration between 5 parts per billion and 1 percent of the mass of the dielectric material.

Concepts described herein are applicable to both providing dielectric materials on a substrate in a bulk or blanket form (i.e. where the dielectric material is provided as a layer, e.g. as a thin film, over a surface) as well as for filling patterned features of a substrate. Expression "on/in a substrate" in context of providing a precursor formulation and/or the dielectric material on/in a substrate is indicative of this fact. In this context, providing a precursor formulation or the dielectric material "on" a substrate refers to dielectric material being in a bulk of blanket form, while providing a precursor formulation or the dielectric material "in" a substrate refers to dielectric material being provided within patterned features of a substrate. In the following, "dielectric film" may refer to both dielectric material disposed in a bulk/blanket form and dielectric material filling patterned features.

In the embodiments where patterned features of a substrate are filled with dielectric materials as described herein, a substrate may include a plurality of openings, and a dielectric material is disposed within the plurality of openings. The plurality of openings may include openings, holes, or gaps (referred to herein as simply "openings") of various aspect ratios, where, as used herein, "aspect ratio" refers to a ratio between a height or a depth of an opening to a width of an opening. In various embodiments, openings referred to herein may have aspect ratios between 1 and 20, including all values and ranges therein, e.g. between 1 and 15, between 5 and 10, etc. Preferably, dimensions of the openings are on the nanometer scale, e.g. with a width of an opening being about 20 nm and a depth of an opening being about 100 nm, i.e. aspect ratio of 5. Therefore, such structures with openings are sometimes described as nanostructures or nanopatterned structures.

In various embodiments, nanostructures with dielectric materials as described herein could be a part of a semiconductor device or an IP package, e.g. a part of an interconnect, e.g. a backend interconnect, used for providing electrical conductivity in the semiconductor device or the IC package. As used herein, the term "backend interconnect" is used to describe a region of an IC chip containing wiring between transistors and other elements, while the term "frontend interconnect" is used to describe a region of an IC chip containing the rest of the wiring. Nanostructures described herein may be used in any devices or assemblies where one electrically conductive element of the wiring needs to be separated from another electrically conductive element, which could be done both in backend and frontend interconnects. Such devices or assemblies would typically provide an electronic component, such as e.g. a transistor, a die, a sensor, a processing device, or a memory device, and an interconnect for providing electrical connectivity to the component. The interconnect includes a plurality of conductive regions, e.g. trenches and vias filled with electrically conductive materials as known in the art. The plurality of openings filled with dielectric materials as described herein could be used to electrically isolate at least some of the conductive regions from one another. For example, the structure in which the openings are made could be made of a conductive material.

It should be noted that concepts described herein are applicable to most spin-on dielectric materials where a catalyst would assist cross-linking of a spin-on resin, with or without added cross-linking material. However, for illustrative purposes and for the sake of clarity, the descriptions below focus on the use of hydrosilane-containing spin-on materials that may be used for forming carbosilane-based dielectric materials.

As used herein, the term "spin-on dielectric material" and variations thereof is used to describe dielectric materials formed using liquid precursors applied to a substrate using any one of known coating techniques including, but not limited to e.g. spin-coating, CVD, or other similar coating techniques.

Carbosilane materials may provide advantageous properties for interlayer dielectrics, such as low dielectric constant values, low electrical leakage, unique etch properties, mechanical integrity, and thermal stability. Furthermore, chemical composition and/or processing of carbosilane-based precursors may be adapted to enable the precursor materials to flow into gaps or openings without or with reduced amount of defects, which would be particularly advantageous and desirable for high-aspect ratio structures. For example, some embodiments of the present disclosure are based on synthesizing non-volatile oligomers containing multiple trisilacyclohexane ring groups connected by short chemical linkers. Due to their low glass transition temperature (Tg), when these oligomers are spun onto a wafer, they can fill or reflow into patterned holes and gaps. After the fill is complete, the oligomers are subjected to some shock (thermal, chemical, UV, etc.) that causes the oligomers to crosslink into a solid thin film that fills the vertical features of the chip. The material may be subsequently cured.

In various aspects, carbosilane-based dielectric materials disclosed herein include cyclic carbosilane units. The material can be, for example, a dielectric material, a spin-on dielectric material, an interlayer dielectric material and/or an etch-selective material. The material can be made from cyclic carbosilane precursors that can be applied to a nanopatterned substrate, for example a silicon wafer, or any other structure with openings by techniques such as spin coating or other suitable deposition processes such as vapor phase deposition. In some embodiments, the resulting material can exhibit relatively low dielectric values (e.g., less than 2.2), may be hydrophobic, and can be resistant to chemical attack (such as chemicals used in typical integrated circuit fabrication processes).

Embodiments of the present disclosure describe cyclic carbosilane monomers that may be used to produce oligomers (precursors) that in turn can be disposed on/in a substrate to provide a carbosilane-based dielectric material on/in a substrate. Upon activation of the cross-linking catalysts, such as e.g. shown in FIGS. 2a and 2b, the oligomeric material provided on/in the substrate can be polymerized into a hard, cross-linked material. Flow charts illustrating some of the steps that can be used from monomer to a carbosilane-based dielectric material in accordance with various embodiments, are provided in FIGS. 3 and 4.

Materials such as the carbosilane-based materials described herein which possess multiple Si—H functionality exhibit good air stability at room temperature, allowing aged formulations to be used. However, the Si—H bonds do provide a latent site of reactivity upon thermal activation. Under typical processing conditions, these SiH bonds can be consumed via reactions with $O_2$, $H_2O$ or through higher temperature internal reactions likely involving hemolysis reactions. Although these reactions can be controlled and can lead to materials with good dielectric properties, the nature of the reactions leads to non-uniformities in the resulting materials. This may be attributed to non-uniform access to coreactants such as $H_2O$ or $O_2$ as function of location within film (top vs bottom or within feature vs atop feature). Relying on introduction of one of the coreactants during the coating and baking process can inherently be a source for non-uniformity. In order to avoid this, both (or all) coreactants could be introduced during the spincoating process with a catalyst to allow for low temperature cross-linking to occur gradually. In the case of the carbosilane-based precursors described herein, the SiH functionality can be efficiently reacted through the intermediacy of the catalyst in a form of a strong acid or a Lewis acid, such as e.g. tris(pentafluorophenyl)borane ($B(C_6F_5)_3$), and an appropriate cross-linker (i.e. a precursor compound being cross-linked). The cross-linker can contain various types of cross-linking groups depending on the properties required for the resulting dielectric material. For example, for introduction of oxygen crosslinks, ethoxysilanes, ethers and alcohols can be used; for introduction of carbon crosslinks, multifunctional allyl, vinyl, alkynyl and other unsaturated derivatives can be used. The ratio of SiH and coreactant (ie Si—OEt, Si-allyl etc.) can be fine-tuned to optimize film properties including uniformity.

In general, the term "strong acid" is used to describe an acid with $pK_a$ value being less than 3. As is well-known, $pK_a$ is a measure of strength of acids, with the smaller value of $pK_a$, the stronger the acid.

In order to maintain stability of formulation and prevent reactions from occurring in solution before film coating, according to some embodiments, a catalyst is protected in a form which can be re-activated thermally during film baking process. FIGS. 2a and 2b provide chemical structures for protected catalysts, according to various embodiments of the present disclosure.

FIG. 2a provides an example of a cross-linking catalyst in a form of a Lewis acid protected with a Lewis basic molecule. In particular, FIG. 2a illustrates a catalyst in a form of $B(C_6F_5)_3$, protected with an exemplary protective group in a form of pyridine.

In the case of a BCF catalyst such as e.g. $B(C_6F_5)_3$, the Lewis acidic boron atom can be complexed via a low molecular weight Lewis basic molecule such as a pyridine, amines, ethers, sulfoxides, ketones, amides etc. and rendered inactive to SiH coupling chemistry at room temperature. An excess of the Lewis base (shown in the left part of FIG. 2a, referenced as "Before Coating") can be used to ensure that the BCF catalyst is completely deactivated or sequestered, i.e. to ensure that the catalyst does not facilitate cross-linking within the coating formulation. After coating the material, the excess Lewis base may be removed concurrently with casting solvent (shown in the middle part of FIG. 2a, referenced as "After Coating"). Some examples of an appropriate solvent include toluene, mesitylene, benzene, dichloroethane, and cyclohexane. In some cases, the solvent can serve the role of the Lewis base (in great excess), examples including cyclohexanone, dimethylformamide, 2-heptanone, N-methylpyrrolidine, etc.

Depending on the strength of the Lewis base which depends e.g. on BCF interaction and other factors, some amount, e.g. one equivalent, of Lewis base may remain in the coated film protecting the BCF until film is baked at high enough temperature to allow decomplexation, thereby liberating the BCF to initiate reactions with Si—H and other functionality within the film. The right part of FIG. 2a, referenced as "After Heating," illustrates that the protective group is dissociated from the BCF catalyst, resulting in the catalyst being active.

With a wide array of Lewis bases of varying vapor pressure and basicity to choose from, it is possible to control process so that cross-linking occurs at precise temperature and over precise periods of time. This is very advantageous for e.g. ensuring that, first, precursor material can adequately flow into high aspect ratio narrow features, before cross-linking and increases in molecular weight can occur. Once in position, an increase in temperature can initiate cross-linking reaction smoothly and gradually, thus reducing or altogether preventing severe effects from outgassing or shrinkage. Note that precursor choice including the type of crosslinking chemistry occurring can minimize outgassing as well.

Being able to control cross-linking as a function of temperature is also important for reducing film roughening effects which can occur e.g. if a film is taken from a partially set state (i.e. partially cross-linked) to higher temperature too quickly. This applies not just to non-porous dielectric films but also, possibly even more importantly, for porous films where low molecular weight diffusive porogens such as cyclodextrins and other organic materials may be used.

Protected catalyst as illustrated in FIG. 2a is introduced in the same coating formulation as the precursor to be cross-linked. Another approach involves introducing one or more of the protected catalyst components through prior attachment to the surface of the wafer (either a top surface or a surface of a patterned feature) via spin-coating or other casting method. For high aspect ratio narrow features, where there is significant exposed surface area relative to the volume that the material needs to fill, a monolayer of a grafted protected catalyst, e.g. a layer that is 0.2-2 nm thick, can be enough to cross-link the precursor material filling the feature (gap). FIG. 2b provides two examples of molecules which could be used to graft Lewis acid in a protected form to the surface. In both of the example shown in FIG. 2b, triethoxysilane groups are used for surface grafting, indicated as "surface-grating end" in FIG. 2b. However, in other embodiments, other reactive silanes, phosphonates, alcohols, amines and other groups may be used. In the first example of FIG. 2b, the BCF catalyst is protected by coordination of Lewis basic pyridine functionality but other Lewis bases can be used. In the second example of FIG. 2b, the BCF catalyst is protected in a form of sulfonium hydridoborate salt which can thermally or photochemically degrade to active BCF catalyst. Other onium salts such as ammonium, phosphonium and iodonium salts can be used in place of the sulfonium group shown in this example.

As previously described herein, explanations provided herein focus on use of BCF catalysts with cyclic carbosilane type materials. However, teachings provided herein allow a person of ordinary skill in the art to extend the concepts, methods, and resulting materials to other Lewis acids and Brönsted acidic catalysts, such as e.g. $H_2NO_3$, triflic acid, HCl, as well as to other silicon based resins. For example, strong bases such as pyridines can also be used to deprotonate strong acid like triflic acid or nitric acid where temperature and substituents on the pyridine can control the release of triflic acid (nitric acid or other acid) in films leading to acid catalyzed chemistry to ensue, depending on silicon resin being used.

FIG. 3 provides a schematic flow chart illustrating a process of forming a dielectric material using a precursor formulation that contains protected catalysts, according to some embodiments of the present disclosure.

Figure 5:
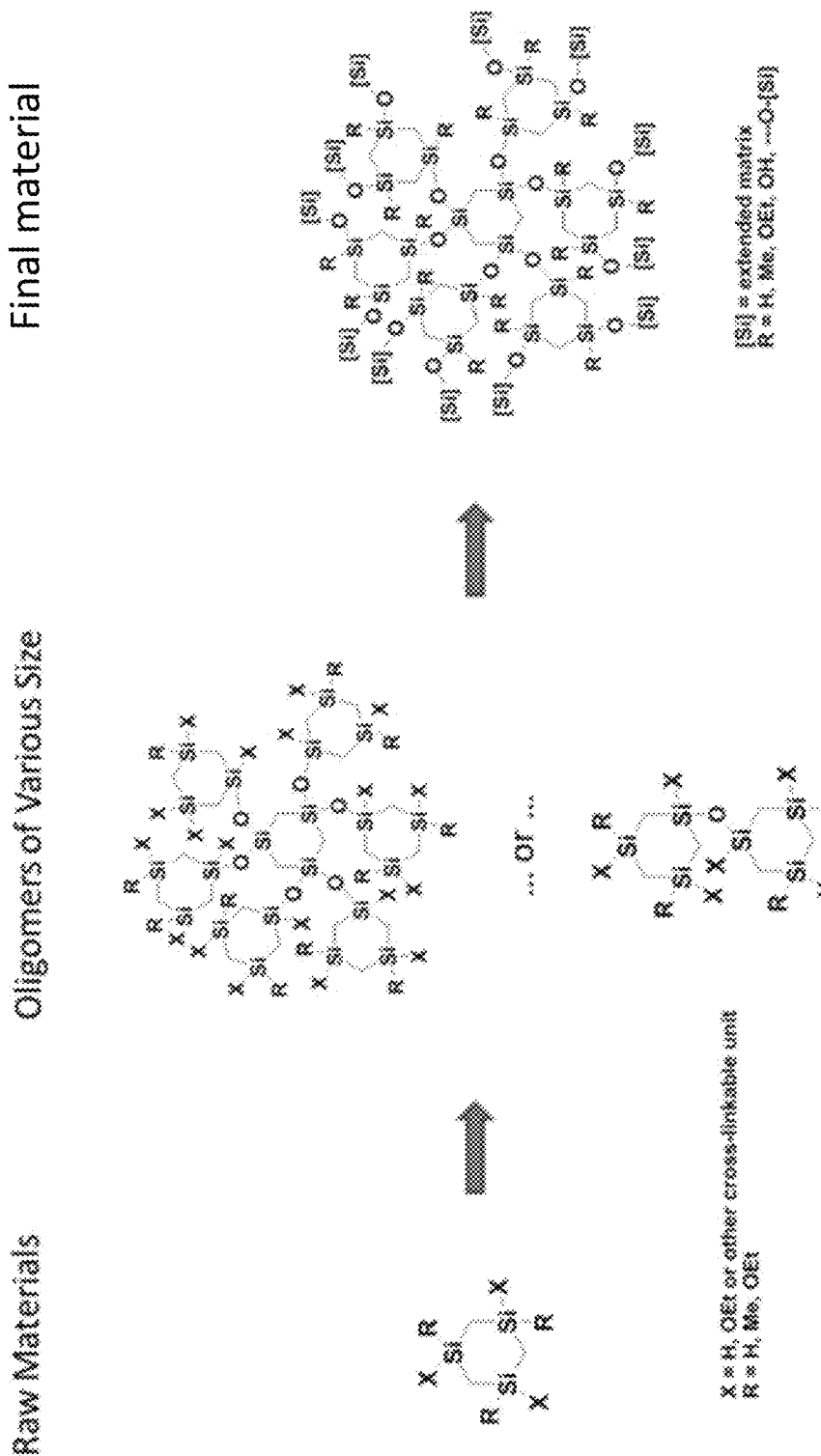
FIG. 5 provides chemical structures illustrating a cross-linked material, an oligomer from which the cross-linked material can be made and the monomer of FIG. 2, according to some embodiments of the present disclosure.

As shown with box 302 in FIG. 3, first, oligomers are synthesized from raw materials based on the cyclic carbosilane monomers such as e.g. the one illustrated in the left part of FIG. 5. The middle part of FIG. 5 illustrates formation of the oligomers from raw materials, while the right part of FIG. 5 illustrates cross-linked dielectric material (prior to curing) provided on/in a substrate.

As illustrated in the right part of FIG. 5, dielectric materials disclosed herein may comprise an interconnected matrix of chemically and thermally stable C-rich trisilacyclohexane (TSCH) units. The TSCH units are covalently attached via different linkages depending on specific TSCH oligomers and crosslinkers used, as described in greater detail below. For example, using oxygen, water, alcohols, or ethers as crosslinking agents leads to SiOSi linkages between two TSCH units. In other cases, the SiOSi linkages can be formed from precursors that contain oxygen as a functional group (R or X). Different functional groups, R and X, and different numbers of R and X can be used to control the molecular weight (size) of the oligomers (some examples are illustrated in the middle part of FIG. 5). Depending on the specific chemical species of R and X, the number of X and R on a TSCH ring, and whether or not an external crosslinker is used, large or small oligomers can be targeted.

The dielectric material includes cyclic carbosilane units made based on the cyclic carbosilane monomers as shown in the left part of FIG. 5.

In various embodiments, cyclic carbosilanes can include rings having various numbers of cyclic members and may have equal numbers of Si and C atoms in the ring. The number of ring members may be, for example, 4, 6, 8, 10, 12, 14, or more. In one set of embodiments, the dielectric material may be comprised of cyclic carbosilane units that consist of six member rings, each of which includes three carbon atoms and three silicon atoms in the ring. The cyclic carbosilanes may be void of cyclic atoms that are not Si or C. Low k dielectric materials can be produced from oligomers made from two or more C-rich TSCH derivatives. The TSCH derivatives may be the same or different and may include different functional groups attached to the cyclic Si atoms. The cyclic carbons may also be functionalized or may be void of functional groups. In some embodiments, each cyclic Si atom in the TSCH unit may be independently bonded to an R group and a cross-linkable X group, as shown in the left part of FIG. 5.

In some specific embodiments, R can be, for example, H, methyl, ethyl, O—$CH_3$ or O-Et. The R group attached to Si may be the same or different as X and may include, for example, H, alkyl or OR' where R' is a functional group, such as, for example, an alkyl group comprising hydrogen atoms and from 1 to 10 carbon atoms or from 1 to 30 carbon atoms. In addition, R' optionally comprises heteroatoms such as oxygen atoms, nitrogen atoms, sulfur atoms, chlorine atoms, and or fluorine atoms. The functional group R' can be a group such as, —$CH_3$, —$CH_2CH_3$, —$CH_2CH_2CH_3$, —$CH_2CH_{2a}CH_2CH_3$, —$CH_2CH_2CH_2CH_2CH_3$, —$CH_2CH(CH_3)_2$, —$CH_2CH_2CH(CH_3)_2$, —$CH_2CH_2CH(CH_2CH_3)_2$, —$CH_2OCH_3$ and —$CH_2CH_2OCH_3$. R' may also include phenyl groups, allyl groups and vinyl groups. Examples include $C_6H_5$—$CH_2$, $CH_2$=$CHCH_2$ and $CH_2$=$CH$. In certain embodiments R' is a methyl group, ethyl group, or can be SiR"3 where R" can be the same or different and can be H or an alkyl group such as, for example, —$CH_3$, —$CH_2CH_3$, —$C(CH_3)_3$, —$CH(CH_3)_2$, —$CH_2CH_2CH_3$ or —$CH_2CH_2CH_2CH_3$.

X can be a cross-linkable functional group such as H, OEt or O—$CH_3$. Examples of specific pairings of R and X bound to a common cyclic Si can include, for example, H, H; H, $CH_3$; O-Et, O-Et; $CH_3$, O-Et; and H, O-Et. The R X pairs may be independently selected for each cyclic Si in the cyclic carbosilane unit. In some embodiments, the R X pairs for each cyclic Si in a given unit are the same. Exemplary TSCH derivatives that may be useful as monomer units include 1,3,5-Trisilacyclohexane; 1,1,3,3,5,5-hexamethyl-1,3,5-trisilacyclohexane; 1,1,3,3,5,5-hexaethoxy-1,3,5-trisilacyclohexane; 1,3,5-trimethyl-1,3,5-trisilacyclohexane; 1,3,5-triethoxy-1,3,5-trimethyl-1,3,5-trisilacyclohexane; and 1,3,5-triethoxy-1,3,5-trisilacyclohexane.

In some embodiments, an oligomeric or cross-linked dielectric material may include a cyclic carbosilane unit that is bound to greater than two additional cyclic carbosilane units. In many embodiments, the dielectric material may include a cyclic carbosilane unit that is bound to greater than three additional carbosilane units. For instance, a single TSCH unit (or other cyclic carbosilane) may be covalently bound to three, four, five or six independent TSCH (or other cyclic carbosilane) units. The cyclic carbosilane units may be linked to each other via the cyclic carbon atoms or the cyclic silicon atoms on each of the respective rings. In some embodiments, adjacent cyclic carbosilane units are each linked to each other via cyclic silicon atoms. For example, a silicon atom of a six membered carbosilane ring may be linked to a silicon atom of an adjacent six membered ring via a linking group that may be a single atom such as oxygen. A cyclic carbosilane ring or unit is adjacent to another cyclic carbosilane ring or unit if it is covalently bonded to that ring or unit directly or via an atom or linking group that does not include an additional cyclic carbosilane ring or unit. In some embodiments, linking groups may be limited to, at most, 1, 2, 3, 4, 5, 6, 7, 8, 9, 10, 11, or 12 atoms.

Properties such as the average molecular weight of the oligomers can be pre-determined by controlling reaction conditions such as concentration of components (including monomers and catalyst), time of addition, solvent or co-solvents, and temperature. Molecular weights may be selected to improve the applicability of the precursor when e.g. spun onto a structure with a plurality of openings, e.g. on a nanopatterned substrate. Exemplary average molecular weights for precursors may be greater than or equal to 280, greater than 500, greater than 1000, greater than 2000 or greater than 5000. The oligomers may include, for instance, dimers, trimers, tetramers, pentamers, hexamers, heptamers, octomers, nonomers, or may contain greater than 10, greater than 20 or greater than 30 cyclic carbosilane units. The precursors may be branched and may be essentially void of linear oligomers of greater than three or four monomer units. To provide for dendrimeric branching, some cyclic carbosilane units may be chemically bound to three, four, five or six adjacent cyclic carbosilane units. In some embodiments, two, three, four or more different oligomers may be physically mixed together and then coated onto a substrate. These oligomers may differ, for example, with regard to cyclic carbosilane structure, average molecular weight, molecular weight distribution, atomic percent C, atomic percent Si, atomic percent O, ratio of C:Si:O, amount of branching, capping species and/or porogen content.

In one set of embodiments, different types of oligomers can be produced by joining TSCH derivatives in various ratios. The ratios are often not 1:1 on an equivalents basis. In certain embodiments, monomers may be reacted in ratios (equivalents basis) greater than or equal to 2:1, 3:1, 4:1, 5:1, 6:1, 7:1 or 8:1.

Figure 6:
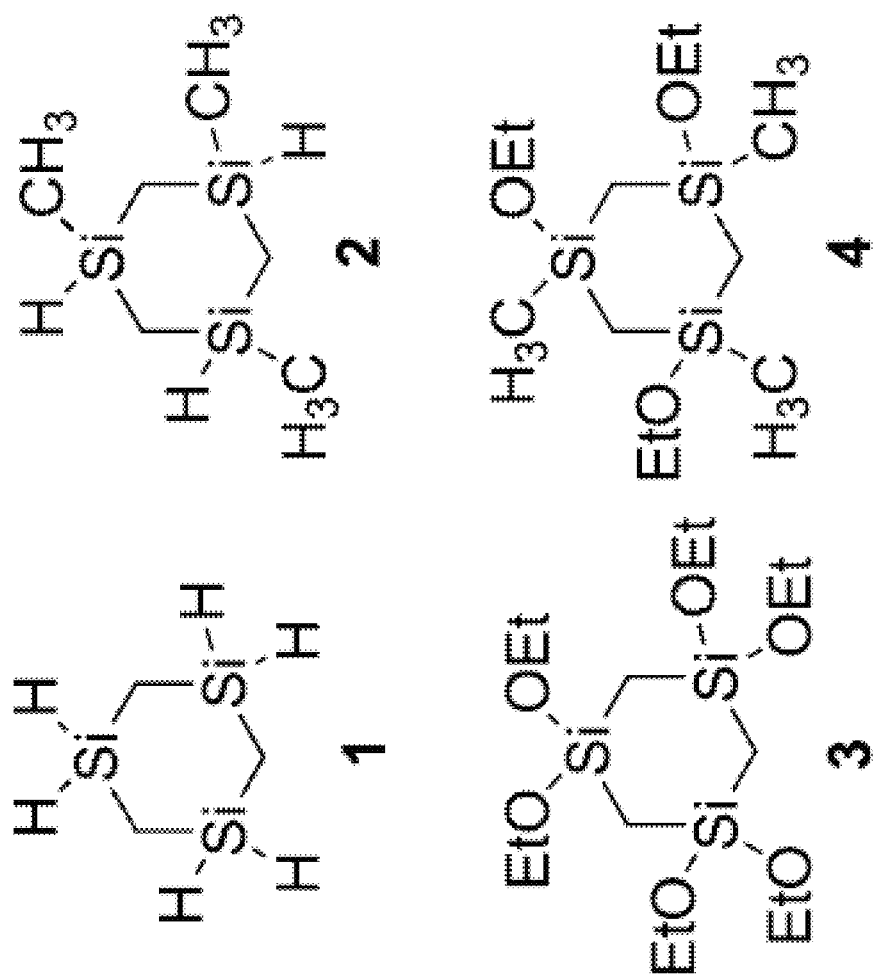
FIG. 6 provides chemical structures of four different TSCH derivatives each of which can serve as a monomer to make oligomer and dielectric material, according to some embodiments of the present disclosure.
Figure 7:
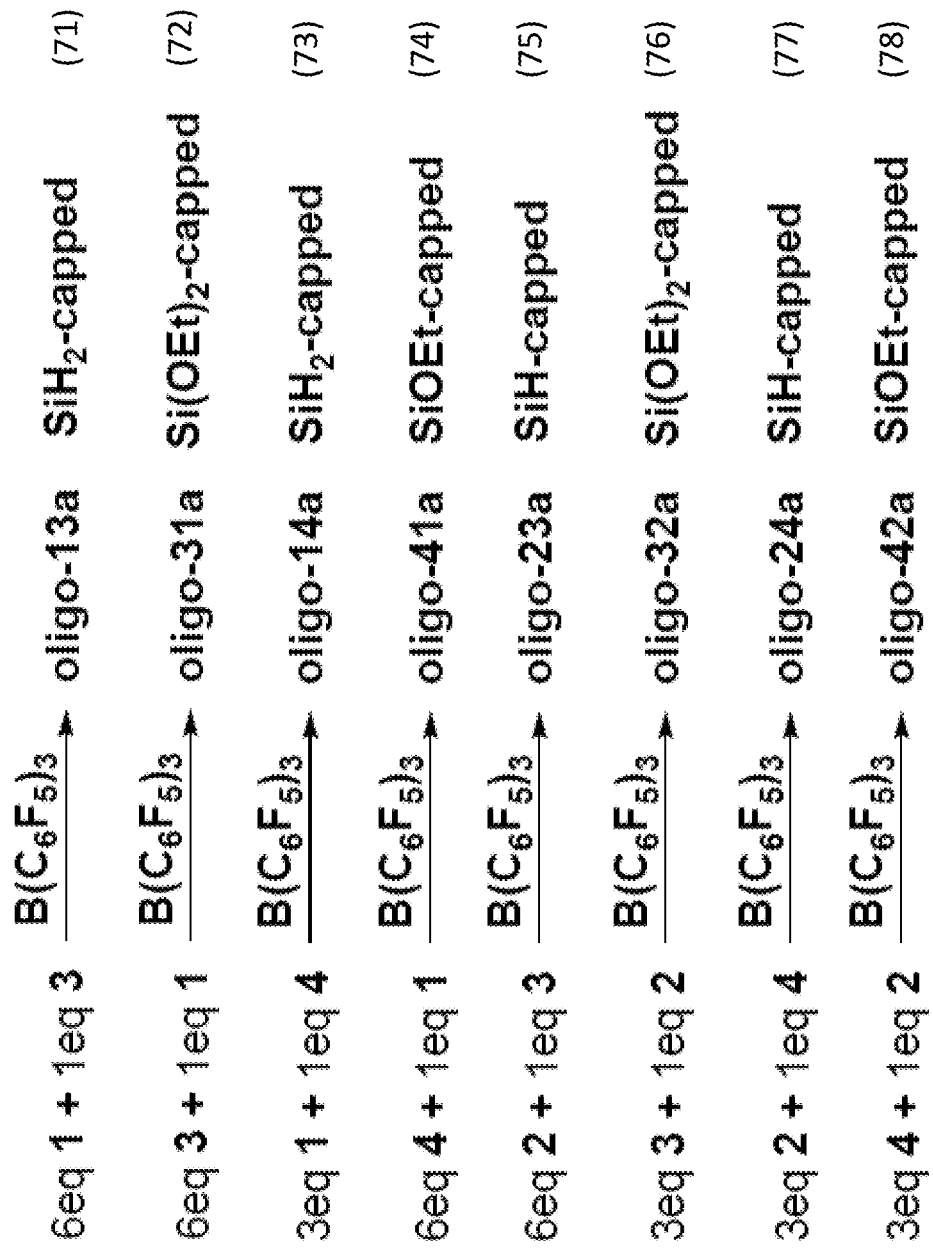
FIG. 7 illustrates equations for synthesizing various carbosilane precursors, according to some embodiments of the present disclosure.

FIG. 6 provides four examples of suitable monomeric cyclic carbosilanes that are either TSCH or TSCH derivatives and could be used for synthesizing precursors for the dielectric material to be coated on/in a substrate, as described herein. In FIG. 6, monomers 1 and 2 are representative of Si—H functionalized species while monomers 3 and 4 are representative of Si—O-Et functionalized species. By selecting different cyclic carbosilanes and reacting them together in pre-selected ratios, some examples of which are shown in FIGS. 7 and 8, a high molecular weight oligomer with tailored properties can be formed. For instance, the oligomer may be selectively capped substantially with Si—O-Et groups or substantially with Si—H or Si—$H_2$ groups.

As used herein, an oligomer is substantially capped with a group if that group occupies more than 99% of the available Si locations. The presence or absence of these groups can be confirmed with the use of $^1$H Nuclear Magnetic Resonance (NMR) technique.

A following notation is used herein to identify various oligomeric precursors formed using monomers 1-4 shown in FIG. 6: "oligomer-$N_1N_2L$" (also referred to as "oligo-$N_1N_2L$" or simply "$N_1N_2L$"). Each of $N_1$ and $N_2$ is an integer between 1 and 4 indicating a respective one of the monomers 1-4 shown in FIG. 6, and L is a letter a, b, c, etc. In this notation, "$N_1N_2$" indicates an oligomer formed using a larger number of equivalents of monomer $N_1$ and a smaller number of equivalents of monomer $N_2$. A particular letter L indicates whether the oligomer was formed directly from the monomers $N_1$ and $N_2$, in which cases letter "a" is used to indicate the initial synthesis, or whether the oligomer was formed from an oligomer formed in the previous cycle and some additional monomers $N_1$ or $N_2$, in which cases letter "b" is used to indicate that the oligomer $N_1N_2$b was formed using $N_1N_2$a and additional monomers, letter "c" is used to indicate that the oligomer $N_1N_2$c was formed using $N_1N_2$b and additional monomers, etc. For example, "oligomer-13a" refers to an oligomer formed using a larger number of equivalents of monomer 1 and a smaller number of equivalents of monomer 3, synthesized from the monomers 1 and 3, "oligomer-13b" refers to an oligomer formed using an oligomer-13a and additional monomers 1 or 3, "oligomer-31a" refers to an oligomer formed using a larger number of equivalents of monomer 3 and a smaller number of equivalents of monomer 1, etc. Additional numbers $N_3$ and $N_4$ may also be used, indicating use of more than two monomers $N_1$ or $N_2$ to synthesize an oligomer. For example, "oligomer-134a" refers to an oligomer formed using a larger number of equivalents of monomer 1 (i.e. $N_1$=1) and a smaller number of equivalents of monomer 3 (i.e. $N_2$=3), and still a smaller number of equivalents of monomer 4 (i.e. $N_3$=4).

In various embodiments, the cyclic carbosilane monomers as shown in the left part of FIG. 5 can be reacted directly or may use a cross-linker to form Si—O—Si linkages from Si—H and Si—O-Et groups, a coupling agent such as a strong Lewis acid may be used. Examples of suitable strong Lewis acids include tris(pentafluorophenyl)borane ($B(C_6F_5)_3$).

Cyclic carbosilane monomers including Si—H groups can react with cyclic carbosilane monomers including Si—O-Et groups until the availability of one of the two groups is exhausted. Reaction may be facilitated in a dry, non-aqueous solvent system. Solvents may be hydrocarbons and may be either aliphatic or aromatic or a mixture. In some embodiments, aromatic solvents such as toluene, benzene, xylene or ethyl benzene may be used. By reacting a greater amount (equivalents basis) of an Si—$H_2$ (or Si—H) functionalized monomer with a lesser amount of an Si—O-Et functionalized monomer, an Si—$H_2$ (or Si—H) capped oligomer can be formed where all or essentially all of the O-Et groups have been converted to Si—O—Si linking groups that form the oligomer. Conversely, by reacting a greater amount of Si—O-Et functionalized monomer with a lesser amount of Si—H functionalized monomer, the resulting precursor oligomer can exhibit an absence of Si—H groups and a large number of Si—O-Et groups. Either oligomer termination may be useful for subsequent cross-linking or binding to an additional substance such as a porogen. If the limiting component includes Si—O-Et groups, the SiH or Si$H_2$ groups in the majority component will convert all, or substantially all, of the Si—O-Et groups to Si—O—Si linkages, evolving ethane in the process. If the limiting component includes SiH and/or SiH$_2$ groups, then the resulting oligomer will be predominantly capped with Si—O—Et or Si—(OEt)$_2$ groups. Additional cyclic carbosilane monomers as well as other compounds may be incorporated to alter the structure of the oligomer precursors. For instance, the oligomer may be the product of two, three, four or more different monomers.

The synthesis of a oligomer precursor produced by combining cyclic carbosilane "1" with cyclic carbosilane "3" (as shown in FIG. 6) is illustrated in equation (71) of FIG. 7, in which 6 equivalents of monomer 1 are reacted with 1 equivalent of monomer 3 in a solvent in the presence of B(C$_6$F$_5$)$_3$. As the ratio of monomer 1 to monomer 3 (equivalents basis) is 6:1, all Si—O—Et groups are converted to Si—O—Si linking groups and the resulting oligomer is SiH$_2$ capped. Examples of several species that are representative of oligomer 13a are illustrated by the structures shown in FIGS. 8a-8e. As illustrated, some of the cyclic carbosilane units are covalently bonded to five or six adjacent cyclic carbosilane units. Although the number of monomer units in each of these species of oligomer 13a can vary, each Si forms either a Si—O—Si linking group or retains an SiH$_2$ group, and Si—O—Et groups are essentially absent. A group is "essentially absent" if it represents less than 0.1% of the Si groups in the oligomer.

Equations (72) through (78) shown in FIG. 7 represent additional embodiments in which different precursor oligomers with various capping species can be chosen by pre-selecting the ratio of monomers to be reacted. Each pairing reacts a monomer including Si—H functional groups with an unequal (on equivalents basis) amount of a monomer including Si—O—Et functional groups. The resulting oligomers are identified and the predominant capping species are indicated in FIG. 7.

Building an oligomer can occur in stages, and in some embodiments a higher molecular weight oligomer can be produced by reacting an oligomer with additional monomer of a same or different type as was used in the initial reaction. For instance, oligomer 13a can attach to cyclic carbosilane monomer "3" to build a higher molecular weight oligomer identified as oligomer 13b. If pendant Si—O—Et or Si—(OEt)$_2$ groups are desired, an excess of monomer 3 or monomer 4 can be reacted with a previously formed oligomer. To keep the periphery of the oligomer capped with SiH$_2$ groups, as in 13a, the additional monomer can be added in an amount where the equivalents of monomer do not exceed the equivalents of SiH2 groups available on oligomer 13a. The second generation oligomer 13b can be reacted with additional monomer in a similar manner to produce an even higher molecular weight oligomer, 13c. Two example embodiments of multi-step oligomer syntheses are provided in FIG. 9 as examples (91) and (92). Oligomers 13b and 13c include components from monomers 1 and 3. Oligomers 134a and 134b include oligomers from monomers 1, 3 and 4.

Figure 9:
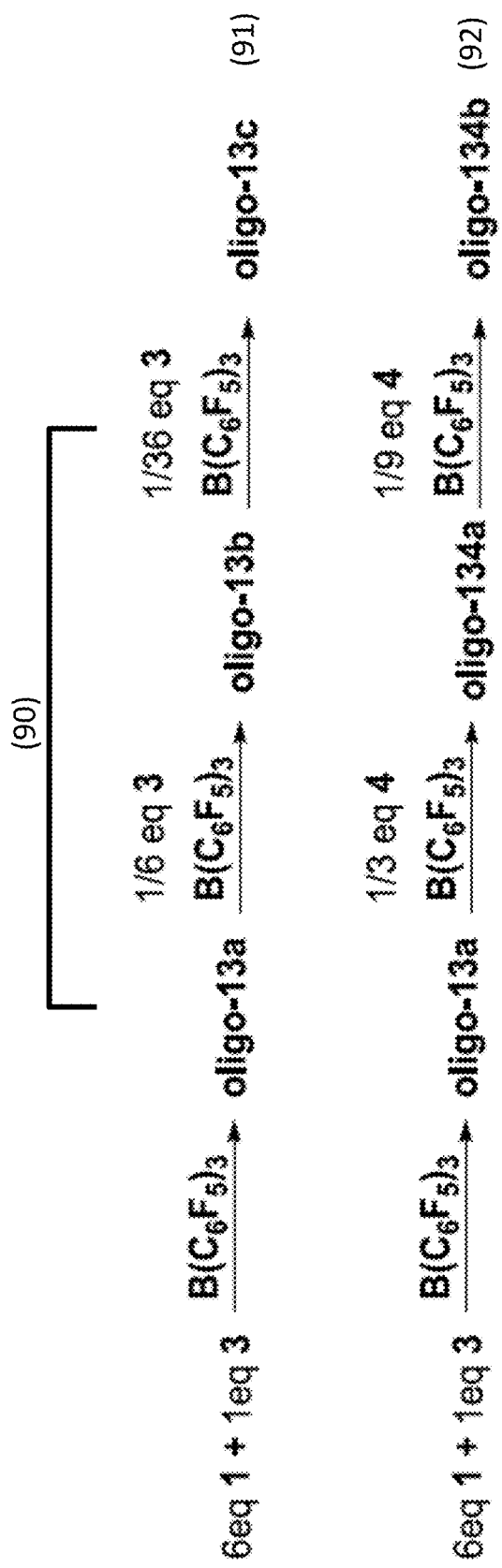
FIG. 9 illustrates equations for synthesizing higher molecular weight precursors, according to some embodiments of the present disclosure.

In FIG. 9, notation such as e.g. part (90) of the example (91) is to be interpreted as follows: 1 equivalent of oligomer 13a is reacted with ⅙ equivalent of monomer 3 in a solvent in the presence of B(C$_6$F$_5$)$_3$ to produce oligomer 13b.

Figure 10:
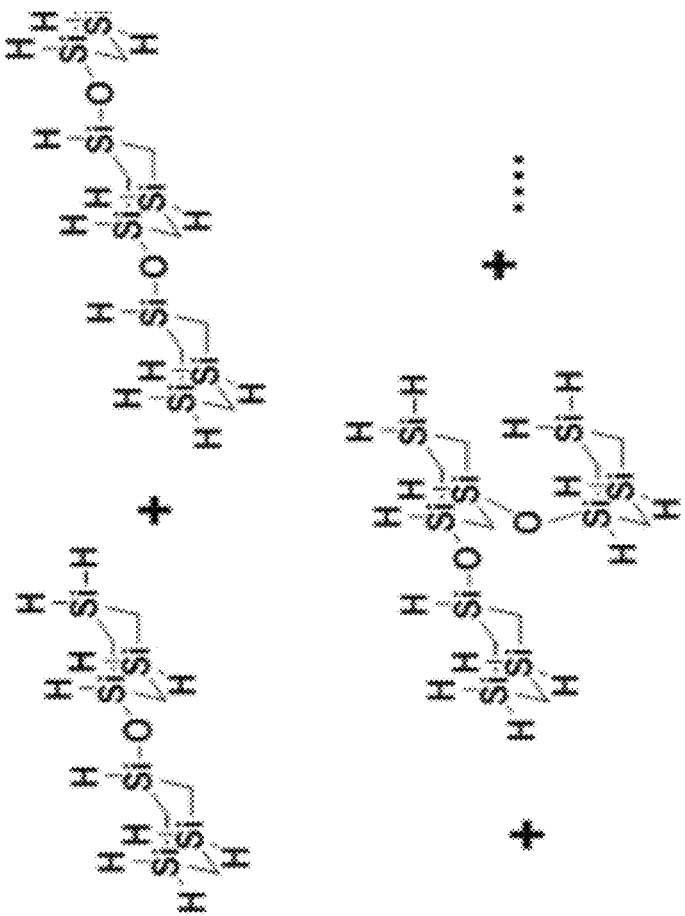
FIG. 10 illustrates synthesis of smaller oligomeric precursors, according to some embodiments of the present disclosure.
Figure 10:
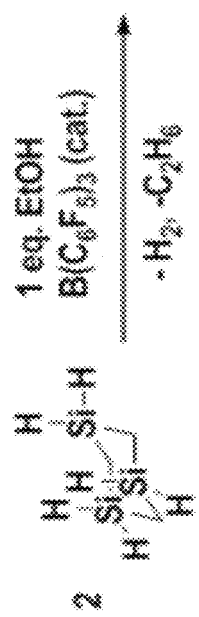

Smaller oligomers can be made by controlling the reaction of only one oligomer (e.g., 1) with a crosslinking group. An example is oligomer 11a. In the presence of the same catalyst, 1 can be crosslinked by the addition of molecules such as ethanol, ethers, or water as shown in FIG. 10. Ratios of 2:1 and 4:1 1:ethanol gave films with nice coatings that can fill the same features and survive all bakes as oligo13a.

FIG. 10 illustrates that smaller oligomers can be made by reaction of trisilacyclohexane with a coreactant such as ethanol, or other alcohols such as methanol or others, or diethyl ether, or other ethers such as dibenzyl ether, which contributes just one oxygen atom that ends up as cross-linking atom between two trisilacyclohexane rings.

Chemical structures and experimental molecular weight distribution may be obtained using Gel Permeation Chromatography (GPC). Comparing oligomer 13a with oligomer 11a using GPC reveals that the largest peak of oligomer 11a is nearly 9 times smaller than the largest peak of oligomer 13a. As a result, the molecular weight distribution of the oligomer 11a materials is about 9× less than oligomer 13a. Smaller molecules may allow fill into smaller opening features while nevertheless being large enough to prevent volatilization during processing.

Instead of or in addition to B(C$_6$F$_5$)$_3$, other strong Lewis acids can be used to effect above chemical transformations including trialkylsilylium cations with weakly coordinating counteranions like triflate, B(C$_6$F$_5$)$_4$ etc.

Oligomers of the desired composition and molecular weight can also be obtained using other coupling reactions not involving strong Lewis acid catalysts. For example, Si-brominated (or chlorinated) trisilacyclohexanes can be used and subjected to controlled hydrolysis reactions to form the same types of oligomers presented above. For example, 1,3,5-tribromotrisilacyclohexane could be reacted directed with water or in conjunction with 1-bromotrisilacyclohexane to give oligomeric species with SiH functionality retained.

As a part of preparing a precursor formulation, oligomeric precursors described above may be mixed with solvent to various dilution. In various embodiments, solvents such as toluene, 2-heptanone, or cyclohexanone may be used. The oligomers can exhibit low volatility (lower than the cyclic carbosilane monomer or dimer, for instance) so that the oligomers can be disposed on and quantitatively retained on a substrate prior to being cross-linked.

For the cases of larger molecular oligomers, the organic solvent, any unreacted raw materials, and low molecular weight precursors can be removed in a rotary evaporator or a similar apparatus. Remaining high molecular weight oligomers can be re-dissolved into new solvents, e.g. 2-heptanone. At this point, a new solvent than the one used in the oligomer synthesis may be used. However, use of new solvents other than that used for reaction synthesis could have manufacturing, environmental health and safety (EHS), and fillability implications. Whether the rotary evaporator is used for solvent exchange or not, the precursor oligomers may then be diluted to target concentrations for spin coating. The dilution tunes the thickness of the film that results after spin coating, as well as filling of patterned features (e.g. incomplete fill, nearly complete fill, or complete fill with various amounts of overburden, i.e. when not only all of the openings are filled, but also there is a layer of thin film over the structure).

Turning back to the method 300 of FIG. 3, protective compound for the cross-linking catalyst is then added (box 304). Such a protected catalyst may be viewed as a catalyst that is initially put into a protected, dormant phase when a protective group (e.g. pyridine) is added.

In case the catalyst is a Lewis acid of comparable, e.g. equal, or greater Lewis acidity than BH$_3$, then the protective compound could include a Lewis basic molecule, such as e.g. a pyridine, an amine, an ether, a sulfoxide, a ketone, or an amide. For example, protected catalyst as shown in FIG. 2a may be formed as a result.

In case the catalyst is a Brönsted acid with $pK_a$ being less than 3, then the protective compound could include a basic molecule such as e.g. a pyridine or an amine.

In some embodiments, the catalyst used for cross-linking of the oligomers on/in the substrate may be the same as was used to form the oligomers in box 302. In such an embodiment, protective groups could be added before the catalyst used for oligomer synthesis decompose, which puts the remaining catalyst into a stable but dormant phase (i.e. the catalyst is not active in this phase).

Alternatively or additionally, catalyst for cross-linking on/in a substrate may be added beyond that used for oligomer synthesis, as is shown with box 306. In some embodiments this is optional and may be skipped, e.g. in case protected catalyst from oligomer synthesis is used for cross-linking on/in a substrate. In other embodiments, this step is not optional in case e.g. all catalysts used for oligomer synthesis have been deactivated/decomposed, either by virtue of forming the oligomers or by purposefully introducing agents that decompose catalysts used in oligomer synthesis. Then box 306 allows adding catalyst to be used for cross-linking on/in the substrate. Together with box 304, this results in protected catalyst being present in a precursor formulation that is to be deposited on/in the substrate. At this point, since the catalysts in the formulation are not active (i.e. they are prevented from facilitating cross-linking of the oligomers), the formulation may be stored for future use.

At some point, the coating formulation comprising protected catalysts as described above may then be provided on/in the substrate (box 308 in FIG. 3). To that end, precursor coating can happen by dispensing and spin coating of the precursor formulation described above using industry standard spin tracks. For example, in some embodiments, spin coating the precursor formulation onto the substrate may include spin coating for 1-60 seconds, including all values and ranges therein, at 500-6000 rotations per minute (rpm), including all values and ranges therein. In other embodiments, precursor formulation may be provided on/in the substrate by means other than spin coating, such as e.g. dipcoating, dropcasting, solution immersion, and flowable chemical vapor deposition (CVD) methods.

In embodiments where the dielectric material is to be provided to fill patterned features, then, after coating, depending on the topography of the patterned features, it is possible that the precursor materials do not properly and/or completely fill the features. In such embodiments, optionally, dense fill of precursor oligomers can be accomplished by heating up the precursors above their glass transition temperature Tg (not shown in FIG. 3), a process referred to herein as a "reflow bake" to indicate that the patterned substrate is baked to allow complete and uniform reflow of the precursor formulation into the features. A person of ordinary skill in the art would readily recognize that different molecular weight species can provide different Tg values and, therefore, different temperatures need to be applied for controlling the reflow bake process. For example, in some embodiments, a reflow bake process for the oligo13a precursors may include heating the precursor to 125 degrees Celsius for 5 minutes, preferably under nitrogen gas.

Once the oligomer precursor formulation have been deposited on/in the substrate, precursors may be cross-linked into a solid carbosilane material using any one of several methods. To that end, protected catalyst may be activated to remove the protective compounds and allow the catalyst to facilitate cross-linking (box 310).

In some embodiments, activation may be achieved by heating the precursor formulation deposited on/in the substrate to a temperature above 50 degrees Celsius, e.g. for 5 to 60 minutes. For example, a mild bake of heating to a temperature less than 200 degrees Celsius would be sufficient to drive off the pyridine protecting groups described above and activate the catalyst to facilitate crosslinking, thus ensuring cross-linking at a much lower than typical temperatures used in prior art approaches.

In some embodiments, activation may be achieved by heating the precursor formulation deposited on/in the substrate to a first temperature between 50 and 300 degrees Celsius, e.g. for 5 to 60 minutes, followed by heating the precursor formulation to a second temperature between 300 and 450 degrees Celsius.

In various embodiments, cross-linking agents may be selected based on the specific precursor oligomers that are being linked. For example, if the oligomers present SiH groups, multifunctional molecules such as silanes containing C=C and Si—O—C bonds may be used. These molecules may include e.g. tetravinylsilane, tetraallylsilane, 1,3,5-trivinyltrisilacyclohexane and tetraethoxysilane.

In some embodiments, once the catalyst has been activated, the cross-linking can be facilitated further, for example, by heat, radiation, a chemical catalyst, or any other means that activate cross-linking.

In case of heat-assisted cross-linking, in some embodiments, temperature may range from 50 to 500 degrees Celsius, from 200 to 450 degrees Celsius, from 250 to 400 degrees Celsius, and from 300 to 375 degrees Celsius. For the case of oligo13a or oligo11a, a 50-350 degrees Celsius bake, i.e. soft-bake, in air for about 5 to 60 minutes, including all values and ranges therein, leads to conversion of two terminal Si—H groups into Si—O—Si bonds that bridge neighboring precursors into a solid dielectric material network. Different schemes may be required depending on whether Si—H, Si—O-Et, or other capping groups are present in the precursor and what specific functionality the cross-linking is intended to bring. For example, Si—O-Et and other groups (such as Si—H or Si—OEt) could cross-link into Si—O—Si groups. Crosslinking groups containing C=C or C=O could crosslinking with SiH groups into C—C—Si or C—O—Si groups. The crosslinking described here brings mechanical stability such as stiffness (high Young's modulus), reduced swelling in organic solvent, and reduced material shrinkage after exposure to UV photons, free electrons, or electron beams.

In case of radiation-assisted cross-linking, UV activation may be used, with UV radiation comprising a broad range of wavelengths. With some activators such as Si—H bonds, C=C, or C=O bonds, any wavelength below 365 nm can be effective. Intensity of UV radiation should be selected to be adequate to fully cross-link the oligomers. In some embodiments an intensity of from 0.01 to 1.0 $W/cm^2$ has been found effective. Exposure time can be adjusted for specific carbosilane systems as well as specific wavelengths and radiation intensity. To achieve complete crosslinking, times from 5 seconds to 20 minutes have been used in many embodiments.

Si—H bonds can also be reacted with compounds including air, or alcohol or Si—OR functionality. In other embodiments, a cross-linking agent such as water can be added to the precursor to link Si—H moieties. The choice of a specific cross-linking agent can also be based on the desired composition of the dielectric material. For example, the ratio of C to O to Si in the dielectric material can be tailored by using specific cross-linking agents.

Cross-linked layers comprised of the carbosilane compounds described herein can exhibit low k values. For instance, the dielectric constant (k) values for the cross-linked carbosilane dielectric materials may be less than 6.0, preferably less than 3.5, less than 3.0, less than 2.5, less than 2.0, less than 1.8 or less than 1.6. Specific ranges for k values can include 1.6 to 3.6, 2.6 to 3.6, 1.6 to 2.6, 1.6 to 2.2, 2.2 to 2.6, 1.3 to 2.5, 1.3 to 1.8 and 1.3 to 1.6. In other embodiments, dielectric materials possessing higher k values may be preferred and can be produced using cyclic carbosilanes. For example, these cross-linked dielectric materials may exhibit k values of greater than 3.0, greater than 3.2 and greater than 3.4. Specific ranges include 3.0 to 4.0, 3.2 to 3.6 and 3.4 to 3.5.

Once the solid carbosilane material is set into a cross-linked network, the wafer can be subjected to higher temperature outgassing bakes at 400-450 degrees Celsius, including all values and ranges therein, for 1-30 minutes, including all values and ranges therein, in order to remove any thermally labile species. Preferably, the outgassing bake is carried out under nitrogen gas. As used herein, the term "outgassing" is used to describe release of zero or more gases that may have been dissolved, trapped, absorbed, or otherwise included within the cross-linked carbosilane material. Such a higher temperature bake may also be used to break bonds and form new bonds that can produce small molecules, which are then outgassed.

Turning back to FIG. 3, the material may also be subsequently cured (box 312), e.g. by using heat, UV photons or/and electron beams, in order to mechanically harden and/or change the etch properties of the carbosilane material. In some embodiments, curing may involve heating the solid carbosilane material between 200-450 degrees Celsius, including all values and ranges therein, while simultaneously exposing to optical radiation of 170-254 nm wavelengths (i.e., deep ultraviolet light), including all values and ranges therein. In other embodiments, curing may involve heating the solid carbosilane material between 200-450 degrees Celsius, including all values and ranges therein, and exposing the solid carbosilane material to electrons.

FIG. 4 provides a schematic flow chart illustrating a process 400 of forming a dielectric material using pre-coating of protected catalysts, according to some embodiments of the present disclosure.

As shown with box 402, first oligomeric precursor is synthesized. This may be carried out as described above for preparing precursor formulation with reference to method 300. In some embodiments of the method 400, synthesis of the oligomeric precursor may include providing deactivated catalyst in the precursor formulation (box 404). Any catalyst that may remain after the synthesis of the oligomeric precursor in box 402 may be removed, e.g. by decomposing the remaining catalyst using an appropriate agent, such as a strong Lewis base which irreversibly coordinates to the catalyst e.g. trimethylphosphine in the case of BCF catalyst. In case where BCF catalyst is used with oligomeric precursor with Si—H bonds, the BCF catalyst may decompose by reaction with Si—H bonds via exchange of $C_6F_5$ group for H. In any case, resulting precursor formulation may then be essentially free of active catalysts and the formulation may be stored for future use.

As shown with box 406, protected catalyst may then be provided on/in a substrate. For example, a thin film of protected catalyst may be provided, the thin film comprising a monolayer of protected catalyst. A thickness of the thin film could be between 0.5 and 2 nm.

In various embodiments, protected catalyst coating can happen by dispensing and spin coating of the protected catalyst described above using industry standard spin tracks. For example, in some embodiments, protected catalyst may be provided on the substrate using spin coating for 1-60 seconds, including all values and ranges therein, at 500-6000 rotations per minute (rpm), including all values and ranges therein. In other embodiments, protected catalyst may be provided on/in the substrate by means other than spin coating, such as e.g. dipcoating, dropcasting, solution immersion, and chemical vapor deposition (CVD) methods.

Next, precursor formulation prepared earlier is provided on the substrate coated with the protected catalyst (box 408), which could be done as described above with reference to box 308 of FIG. 3.

Activation of box 410 and curing of box 412 are also analogous to corresponding boxes 310 and 312 of FIG. 3. Therefore, in the interest of brevity, these descriptions are not repeated here.

Exemplary Structure

Figure 11:
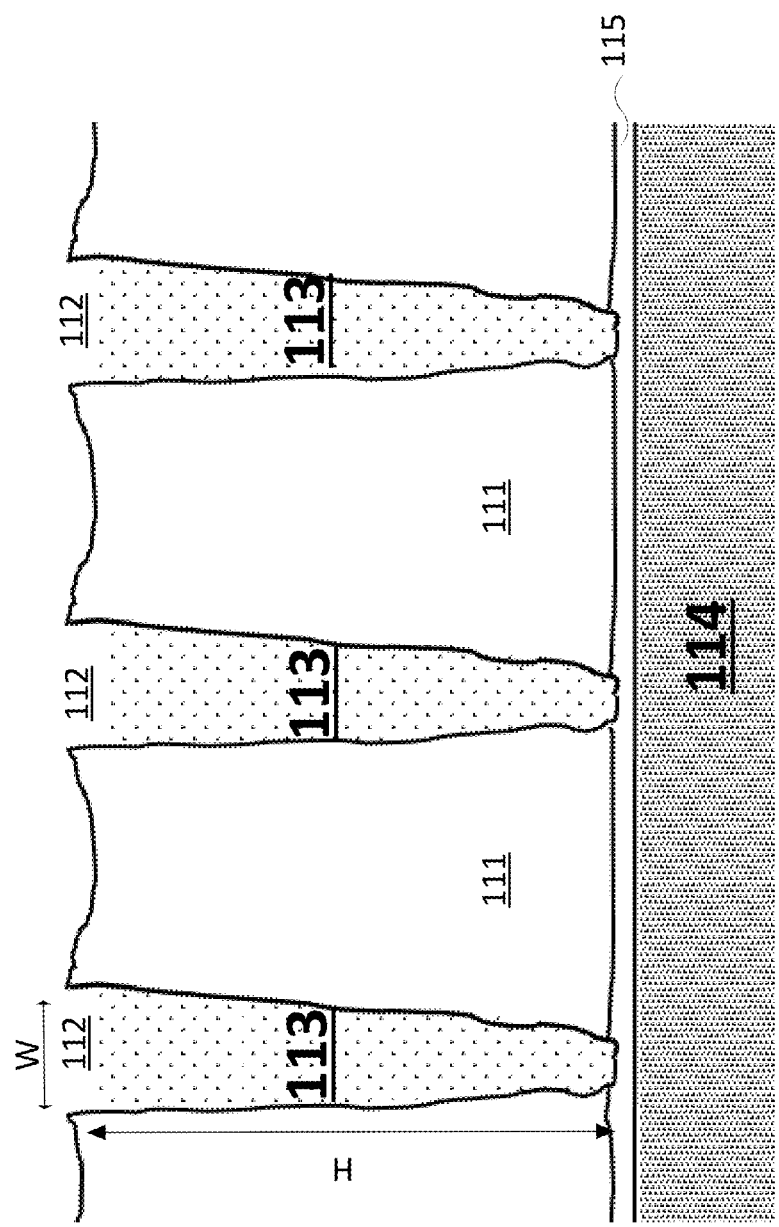
FIG. 11 illustrates an exemplary structure comprising openings filled with a carbosilane-based dielectric material, according to some embodiments of the present disclosure.

FIG. 11 provides a schematic illustration of a cross-section of a structure 111 comprising a plurality of openings 112 filled with carbosilane dielectric material 113, according to some embodiments of the present disclosure. As can be seen, FIG. 11 is drawn to reflect example real world process limitations, in that the features are not drawn with precise right angles and straight lines. The structure 111 can be disposed on a substrate 114, and an etch-stop layer 115 may be provided to ensure that when the openings 112 are made by etching the structure 111, etching does not extend into the substrate 114. Height H and width W of the openings 112 are also indicated in FIG. 11.

In a particular example shown in FIG. 11, the dielectric material 113 is shown to fill the features 112 to a large extend, but not completely—the upper parts of the openings 112 are not filled with the material 113. However, in other embodiments, the dielectric material may fill the features completely and may even form a thin film covering the entire structure 112.

In various embodiments, each one of the structure 111 and the substrate 114 may be comprised of one or more of silicon, silicon dioxide, germanium, indium, antimonide, lead telluride, indium arsenide, indium phosphide, gallium arsenide and gallium antimonide. In some embodiments, the structure 111 may be an interlayer dielectric (ILD). Two or more layers of the interlayer dielectric may be stacked to form an integrated circuit. In some embodiments, the ILD may include one or more sacrificial layers deposited over a dielectric substrate. The ILD may include one or more dielectric materials, which are understood to be materials that are insulators but are polarized upon application of an electric field. In some embodiments, the material layer may include a low-k dielectric material, that is, a material with a dielectric constant that is lower than 3.9, i.e., the dielectric constant of silicon dioxide, including all values and ranges from 1.5 to 3.8, such as 1.7, 1.9, 2.1, 2.8, 2.7, etc. Non-limiting examples from which the dielectric materials of the structure 111 may be selected include fluorine-doped silicon dioxide, carbon doped oxide (i.e., carbon-doped silicon dioxide), organo silicate glass, silicon oxycarbide, hydrogenated silicon oxycarbide, porous silicon dioxide, and organic polymer dielectrics such as polyimide, polytetrafluoroethylene, polynorbornenes, benzocyclobutene, hydrogen silsequioxane and methylsilsesquioxane. The structure 111 layer may have a thickness in the range of 50 nm to 300 nm, including all values and ranges therein, such as 100 nm to 300 nm, 100 nm to 200 nm, etc.

In other embodiments, the dielectric material may be provided as a layer, e.g. a thin film, on a substrate.

Implementation in an Interposer

Figure 12:
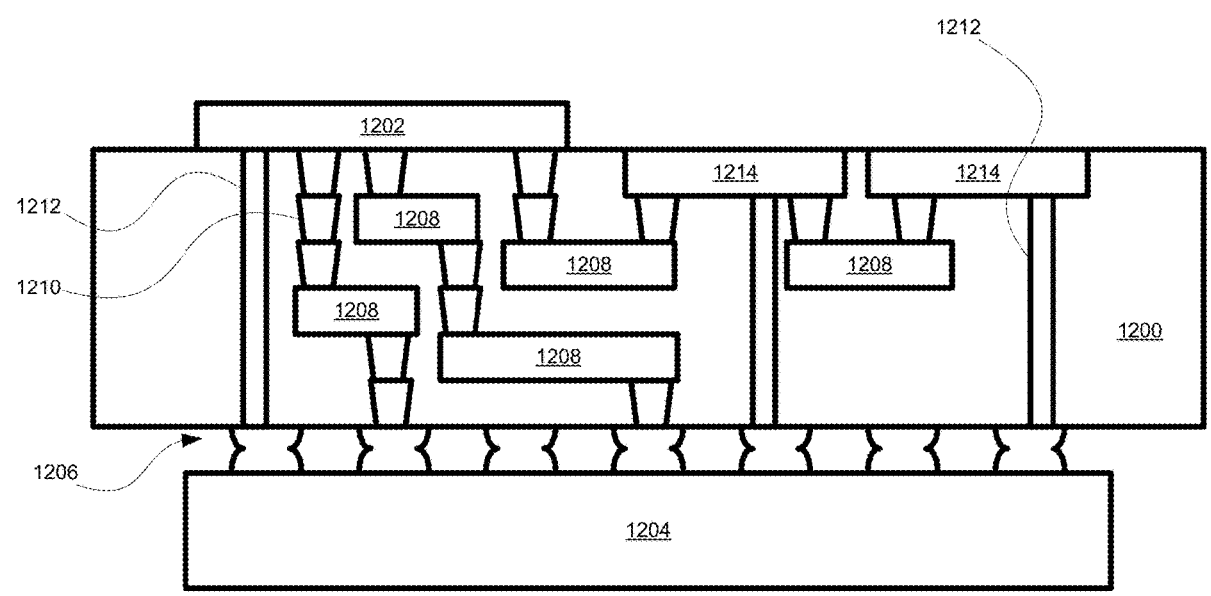
FIG. 12 provides a schematic illustration of an interposer, according to some embodiments of the present disclosure.

In accordance with embodiments of the disclosure, dielectric materials disclosed herein may be used in the fabrication of an interposer, such as e.g. the one shown in FIG. 12. In particular, the structures described herein may be used in the fabrication of various interconnects of the interposer shown in FIG. 12. For example, the materials described herein may be used in forming dielectric regions within the interposer 1200, e.g. regions between at least some of the trenches 1208 and vias 1210, which could be done instead of or in addition to a conventional dual damascene process. Use of the approaches and materials described herein may then be identified by the analysis of the localized dielectric material properties as described herein, such as e.g., density, porosity, propensity for film shrinkage, mechanical properties, and/or chemical composition gradients of oxygen and hydrogen.

FIG. 12 illustrates an interposer 1200 that includes one or more embodiments of the disclosure. The interposer 1200 is an intervening substrate used to bridge a first substrate 1202 to a second substrate 1204. The first substrate 1202 may be, for instance, an integrated circuit die. The second substrate 1204 may be, for instance, a memory module, a computer motherboard, or another integrated circuit die. Generally, the purpose of an interposer 1200 is to spread a connection to a wider pitch or to reroute a connection to a different connection. For example, an interposer 1200 may couple an integrated circuit die to a ball grid array (BGA) 1206 that can subsequently be coupled to the second substrate 1204. In some embodiments, the first and second substrates 1202/1004 may be attached to opposing sides of the interposer 1200. In other embodiments, the first and second substrates 1202/1004 may be attached to the same side of the interposer 1200. In further embodiments, three or more substrates may be interconnected by way of the interposer 1200.

The interposer 1200 may be formed of an epoxy resin, a fiberglass-reinforced epoxy resin, a ceramic material, or a polymer material such as polyimide. In further implementations, the interposer may be formed of alternate rigid or flexible materials that may include the same materials described above for use in a semiconductor substrate, such as silicon, germanium, and other group III-V and group IV materials.

The interposer may include metal interconnect trenches 1208 and vias 1210, including but not limited to through-silicon vias (TSVs) 1212. The vias 1210 may be enclosed by first and second diffusion barrier layers as described herein. The interposer 1200 may further include embedded devices 1214, including both passive and active devices. Such devices include, but are not limited to, capacitors, decoupling capacitors, resistors, inductors, fuses, diodes, transformers, sensors, and electrostatic discharge (ESD) devices. More complex devices such as radio-frequency (RF) devices, power amplifiers, power management devices, antennas, arrays, sensors, and MEMS devices may also be formed on the interposer 1200.

Implementation in a Computing Device

Figure 13:
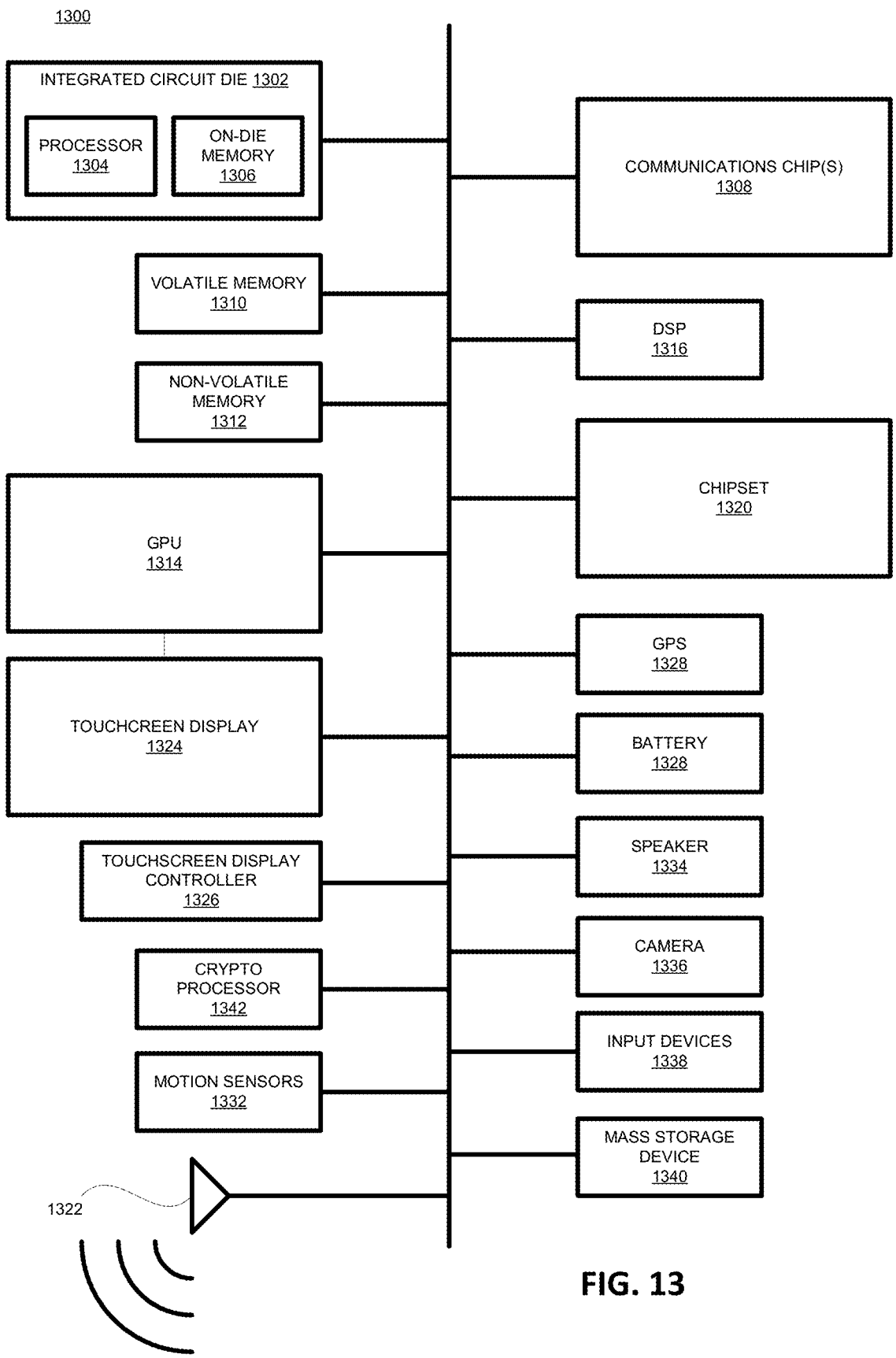
FIG. 13 provides a schematic illustration of a computing device built in accordance with some embodiments of the present disclosure.

In accordance with embodiments of the disclosure, structures comprising dielectric materials disclosed herein may be used in the fabrication of a computing device, such as e.g. the one shown in FIG. 13. In particular, the structures described herein may be used in the fabrication of various interconnects of the computing device shown in FIG. 13.

FIG. 13 illustrates a computing device 1300 in accordance with one embodiment of the disclosure. The computing device 1300 may include a number of components. In one embodiment, these components may be attached to one or more motherboards. In an alternate embodiment, some or all of these components may be fabricated onto a single system-on-a-chip (SoC) die. The components in the computing device 1300 include, but are not limited to, an integrated circuit die 1302 and at least one communications logic unit 1308. In some implementations the communications logic unit 1308 may be fabricated within the integrated circuit die 1302 while in other implementations the communications logic unit 1308 may be fabricated in a separate integrated circuit chip that may be bonded to a substrate or motherboard that may be shared with or electronically coupled to the integrated circuit die 1302. The integrated circuit die 1302 may include a CPU 1304 as well as on-die memory 1306, often used as cache memory, that can be provided by technologies such as embedded DRAM (eDRAM) or spin-transfer torque memory (STTM or STT-MRAM).

Computing device 1300 may include other components that may or may not be physically and electrically coupled to the motherboard or fabricated within an SoC die. These other components include, but are not limited to, volatile memory 1310 (e.g., DRAM), non-volatile memory 1312 (e.g., ROM or flash memory), a graphics processing unit 1314 (GPU), a digital signal processor 1316, a crypto processor 1342 (a specialized processor that executes cryptographic algorithms within hardware), a chipset 1320, an antenna 1322, a display or a touchscreen display 1324, a touchscreen controller 1326, a battery 1328 or other power source, a power amplifier (not shown), a voltage regulator (not shown), a global positioning system (GPS) device 1328, a compass 1330, a motion coprocessor or sensors 1332 (that may include an accelerometer, a gyroscope, and a compass), a speaker 1334, a camera 1336, user input devices 1338 (such as a keyboard, mouse, stylus, and touchpad), and a mass storage device 1340 (such as hard disk drive, compact disk (CD), digital versatile disk (DVD), and so forth).

The communications logic unit 1308 enables wireless communications for the transfer of data to and from the computing device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications logic unit 1308 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1300 may include a plurality of communications logic units 1308. For instance, a first communications logic unit 1308 may be dedicated to shorter range wireless communications such as Wi-Fi and Bluetooth and a second communications logic unit 1308 may be dedicated to longer range wireless communications such as GPS, EDGE, GPRS, CDMA, WiMAX, LTE, Ev-DO, and others.

The processor 1304 of the computing device 1300 may include one or more interconnects or other lithographically patterned features that are formed in accordance with embodiments of the present disclosure. The term "processor" may refer to any device or portion of a device that processes electronic data from registers and/or memory to transform that electronic data into other electronic data that may be stored in registers and/or memory.

The communications logic unit 1308 may also include one or more interconnects or other lithographically patterned features that are formed in accordance with embodiments of the present disclosure.

In further embodiments, another component housed within the computing device 1300 may contain one or more interconnects or other lithographically patterned features that are formed in accordance with embodiments of the present disclosure.

In various embodiments, the computing device 1300 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1300 may be any other electronic device that processes data.

Some Examples in accordance with various embodiments of the present disclosure are now described.

Example 1 provides a precursor formulation for forming a dielectric material including cross-linked cyclic carbosilane units having a ring structure including C and Si, the formulation including a cyclic carbosilane precursor and a catalyst protected with a protective compound or functionality. The protective compound/functionality is configured to prevent the catalyst from facilitating cross-linking of the precursor, and, upon receiving an excitation, the protective compound is configured to decompose, become neutralized, or otherwise be rendered inactive to allow the catalyst to facilitate cross-linking of the precursor into a solid carbosilane material.

Example 2 provides the precursor formulation according to Example 1, where the catalyst includes a Lewis acid of comparable (e.g. equal) or greater Lewis acidity than $BH_3$, and the protective compound includes a Lewis basic molecule.

Example 3 provides the precursor formulation according to Example 2, where the Lewis basic molecule includes a pyridine, an amine, an ether, a sulfoxide, a phosphine, a ketone, or an amide.

Example 4 provides the precursor formulation according to Examples 2 or 3, where the Lewis acid includes tris(pentafluorophenyl)borane ($B(C_6F_5)_3$).

Example 5 provides the precursor formulation according to Example 1, where the catalyst includes a Brönsted acid with $pK_a$ being less than 3, and the protective compound includes a basic molecule.

Example 6 provides the precursor formulation according to Example 5, where the basic molecule includes a pyridine, a phosphine or an amine.

Example 7 provides the precursor formulation according to any one of the preceding Examples, where the excitation includes a thermal excitation of heating the precursor formulation to a temperature above 50 degrees Celsius, e.g. for 5 to 60 minutes.

Example 8 provides the precursor formulation according to any one of Examples 1-6, where the excitation includes a thermal excitation of heating the precursor formulation to a first temperature between 50 and 300 degrees Celsius, e.g. for 5 to 60 minutes, followed by heating the precursor formulation to a second temperature between 300 and 450 degrees Celsius.

Example 9 provides the precursor formulation according to any one of the preceding Examples, where the precursor includes multiple 1,3,5-trisilacyclohexane rings where the rings are bonded to one another via an oxygen atom or/and a terminal hydrogen atom.

Example 10 provides a method of making a device including a dielectric material including cross-linked cyclic carbosilane units having a ring structure including C and Si, the method including: providing a cyclic carbosilane precursor onto a substrate, the precursor including a catalyst configured to, when activated, facilitate cross-linking of the precursor into a solid carbosilane material, where the catalyst is not activated when the cyclic carbosilane precursor is provided onto the substrate; and providing an excitation to activate the catalyst to cross-link the precursor into the solid carbosilane material.

Example 11 provides the method according to Example 10, where the catalyst includes a Lewis acid of comparable or greater Lewis acidity than $BH_3$, protected from facilitating cross-linking, until activated, with a Lewis basic molecule.

Example 12 provides the method according to Example 11, where the Lewis basic molecule includes a pyridine, an amine, an ether, a sulfoxide, a ketone, or an amide.

Example 13 provides the method according to Examples 11 or 12, where the Lewis acid includes tris(pentafluorophenyl)borane ($B(C_6F_5)_3$).

Example 14 provides the method according to Example 10, where the catalyst includes a Brönsted acid with ka being less than 3, protected from facilitating cross-linking, until activated, with a basic molecule.

Example 15 provides the method according to Example 14, where the basic molecule includes a pyridine or an amine.

Example 16 provides the method according to any one of Examples 10-15, where providing the excitation includes heating the precursor provided onto the substrate to a temperature above 50 degrees Celsius, e.g. for 5 to 60 minutes.

Example 17 provides the method according to Example 16, where the heating is carried out under nitrogen gas.

Example 18 provides the method according to any one of Examples 10-15, where providing the excitation includes heating the precursor provided onto the substrate to a first temperature between 50 and 300 degrees Celsius, e.g. for 5 to 60 minutes, followed by heating the precursor to a second temperature between 300 and 450 degrees Celsius.

Example 19 provides the method according to Example 18, where the heating is carried out under nitrogen gas.

Example 20 provides the method according to any one of Examples 10-19, where the precursor includes multiple 1,3,5-trisilacyclohexane rings where the rings are bonded to one another via an oxygen atom or/and a terminal hydrogen atom.

Example 21 provides the method according to any one of Examples 10-20, where providing the precursor onto the substrate includes spin-coating the precursor onto the substrate for 0-60 seconds at 500-6000 rotations per minute (rpm).

Example 22 provides the method according to any one of Examples 10-21, further including curing the solid carbosilane material.

Example 23 provides the method according to Example 22, where curing includes heating the solid carbosilane material between 200-450 degrees Celsius while simultaneously exposing to optical radiation of 170-254 nanometer wavelengths.

Example 24 provides the method according to Example 22, where curing includes heating the solid carbosilane material between 200-450 degrees Celsius and exposing the solid carbosilane material to electrons.

Example 25 provides the method according to any one of Examples 10-24, further including deactivating a Lewis acid catalyst used in synthesis of the precursor by adding an excess of a Lewis base, such as e.g. a pyridine or an amine, prior to providing the precursor onto the substrate.

Example 26 provides a method of making a device including a dielectric material including cross-linked cyclic carbosilane units having a ring structure including C and Si, the method including: providing, onto a substrate, a catalyst configured to, when activated, facilitate cross-linking of a cyclic carbosilane precursor into a solid carbosilane material; providing a cyclic carbosilane precursor onto the substrate provided with the catalyst, where the catalyst is not activated when the cyclic carbosilane precursor is provided onto the substrate; and providing an excitation to activate the catalyst to cross-link the precursor into the solid carbosilane material.

Example 27 provides the method according to Example 26, where providing the catalyst includes providing a thin film of the catalyst on a surface of the substrate.

Example 28 provides the method according to Example 27, where the thin film includes a monolayer of the catalyst.

Example 29 provides the method according to Example 27, where a thickness of the thin film is between 0.5 and 2 nm.

Example 30 provides the method according to any one of Examples 26-29, where the catalyst includes a Lewis acid of comparable or greater Lewis acidity than $BH_3$, protected from facilitating cross-linking, until activated, with a Lewis basic molecule.

Example 31 provides the method according to Example 30, where the Lewis basic molecule includes a pyridine, an amine, an ether, a sulfoxide, a ketone, or an amide.

Example 32 provides the method according to Examples 30 or 31, where the Lewis acid includes tris(pentafluorophenyl)borane ($B(C_6F_5)_3$).

Example 33 provides the method according to any one of Examples 26-29, where the catalyst includes a Brönsted acid with $pK_a$ being less than 3, protected from facilitating cross-linking, until activated, with a basic molecule.

Example 34 provides the method according to Example 33, where the basic molecule includes a pyridine or an amine.

Example 35 provides the method according to any one of Examples 26-34, where providing the excitation includes heating the precursor provided onto the substrate to a temperature above 50 degrees Celsius, e.g. for 5 to 60 minutes.

Example 36 provides the method according to Example 35, where the heating is carried out under nitrogen gas.

Example 37 provides the method according to any one of Examples 26-34, where providing the excitation includes heating the precursor provided onto the substrate to a first temperature between 50 and 300 degrees Celsius, e.g. for 5 to 60 minutes, followed by heating the precursor to a second temperature between 300 and 450 degrees Celsius.

Example 38 provides the method according to Example 37, where the heating is carried out under nitrogen gas.

Example 39 provides the method according to any one of Examples 26-38, where the precursor includes multiple 1,3,5-trisilacyclohexane rings where the rings are bonded to one another via an oxygen atom or/and a hydrogen atom.

Example 40 provides the method according to any one of Examples 26-39, where providing the precursor onto the substrate includes spin-coating the precursor onto the substrate for 0-60 seconds at 500-6000 rotations per minute (rpm).

Example 41 provides the method according to any one of Examples 26-40, further including curing the solid carbosilane material.

Example 42 provides the method according to Example 41, where curing includes heating the solid carbosilane material between 200-450 degrees Celsius while simultaneously exposing to optical radiation of 170-254 nanometer wavelengths.

Example 43 provides the method according to Example 41, where curing includes heating the solid carbosilane material between 200-450 degrees Celsius and exposing the solid carbosilane material to electrons.

Example 44 provides the method according to any one of Examples 26-43, further including deactivating a Lewis acid catalyst used in synthesis of the precursor by adding an excess of a Lewis base prior to providing the precursor onto the substrate.

Example 45 provides a carbosilane-based device, the device including a dielectric material disposed as a film on a substrate or/and within a plurality of openings of the substrate, the dielectric material including cross-linked cyclic carbosilane units having a ring structure including C and Si, where at least a first cyclic carbosilane unit is linked to at least two adjacent cyclic carbosilane units and where the dielectric material includes a porous material with pore radius being between 1 and 10 nm.

Example 46 provides the device according to Example 45, where the pore radius varies less than 10-20 percent of the average pore radius.

Example 47 provides the device according to Examples 45 or 46, where a thickness of the film varies less than 10 percent of the average thickness.

Example 48 provides the device according to any one of Examples 45-47, where the dielectric material includes boron in concentration between 5 parts per billion and 1 percent of the mass of the dielectric material.

Example 49 provides the device according to any one of Examples 45-48, where the first cyclic carbosilane unit is linked via Si—O—Si links to each of the at least four separate cyclic carbosilane units.

Example 50 provides the device according to any one of Examples 45-49, where at least one cyclic Si atom in the first cyclic carbosilane unit is covalently bonded to two adjacent cyclic carbosilane units.

Example 51 provides the device according to any one of Examples 45-50, where the cyclic carbosilane units are essentially free of Si—O—Et groups.

Example 52 provides the device according to any one of Examples 45-51, where essentially all of the cyclic carbosilane units are capped with Si—H groups or Si—$H_2$ groups.

Example 53 provides the device according to any one of Examples 45-52, where the cyclic carbosilane units are essentially free of Si—H groups.

Example 54 provides the device according to any one of Examples 45-53, where the cyclic carbosilane units are capped with Si—O-Et or Si(OEt)$_2$ groups.

Example 55 provides the device according to any one of Examples 45-54, where the dielectric material includes two or more structurally distinct cyclic carbosilane units.

Example 56 provides the device according to any one of Examples 45-55, where the dielectric material has a k value lower than the k value of the substrate.

Example 57 provides the device according to any one of Examples 45-56, where the dielectric material has a porosity of between 0-60%.

Example 58 provides a device including a dielectric material disposed as a film on a substrate or/and within a plurality of openings of the substrate, the dielectric material including cross-linked cyclic carbosilane units having a ring structure including C and Si, where the cross-linked carbosilane units are capped with Si—H groups or Si—H$_2$ groups and where the dielectric material includes a porous material with pore radius being between 1 and 10 nm.

Example 59 provides the device according to Example 58, where the pore radius varies less than 10-20 percent of the average pore radius.

Example 60 provides the device according to Examples 58 or 59, where a thickness of the film varies less than 10 percent of the average thickness.

Example 61 provides the device according to any one of Examples 58-60, where the dielectric material includes boron in concentration between 5 parts per billion and 1 percent of the mass of the dielectric material.

Example 62 provides the device according to any one of Examples 58-61, where the dielectric material has a k value of less than 2.6.

Example 63 provides the device according to any one of Examples 58-62, where the substrate is included of one or more of silicon, silicon dioxide, germanium, indium, antimonide, lead telluride, indium arsenide, indium phosphide, gallium arsenide and gallium antimonide.

Example 64 provides the device according to any one of Examples 58-63, where adjacent cross-linked cyclic carbosilane units are linked via cyclic Si atoms in each cyclic carbosilane unit.

Example 65 provides the device according to any one of Examples 58-64, where the two adjoining cyclic carbosilane units are linked via an oxygen atom.

Example 66 provides the device according to any one of Examples 58-65, where all adjoining cyclic carbosilane units are linked via Si atoms in the carbosilane ring.

Example 67 provides the device according to any one of Examples 58-66, where the dielectric material exhibits a water uptake of less than or equal to 5.0%.

Example 68 provides a carbosilane-based device, the device including a dielectric material disposed as a film on a substrate, the dielectric material including cross-linked cyclic carbosilane units having a ring structure including C and Si, where at least a first cyclic carbosilane unit is linked to at least two adjacent cyclic carbosilane units and where a thickness of the film varies less than 10 percent of the average thickness.

Example 69 provides the device according to Example 68, where the dielectric material includes a porous material with pore radius being between 1 and 10 nm.

Example 70 provides the device according to Example 69, where the pore radius varies less than 10-20 percent.

Example 71 provides the device according to any one of Examples 68-70, where the dielectric material includes boron in concentration between 5 parts per billion and 1 percent of the mass of the dielectric material.

Example 72 provides the device according to any one of Examples 68-71, where the first cyclic carbosilane unit is linked via Si—O—Si links to each of the at least four separate cyclic carbosilane units.

Example 73 provides the device according to any one of Examples 68-72, where at least one cyclic Si atom in the first cyclic carbosilane unit is covalently bonded to two adjacent cyclic carbosilane units.

Example 74 provides the device according to any one of Examples 68-73, where the cyclic carbosilane units are essentially free of Si—O-Et groups.

Example 75 provides the device according to any one of Examples 68-74, where essentially all of the cyclic carbosilane units are capped with Si—H groups or Si—H$_2$ groups.

Example 76 provides the device according to any one of Examples 68-75, where the cyclic carbosilane units are essentially free of Si—H groups.

Example 77 provides the device according to any one of Examples 68-76, where the cyclic carbosilane units are capped with Si—O-Et or Si(OEt)$_2$ groups.

Example 78 provides the device according to any one of Examples 68-77, where the dielectric material includes two or more structurally distinct cyclic carbosilane units.

Example 79 provides the device according to any one of Examples 68-78, where the dielectric material has a k value between 1.5 and 6.0, preferably a k value less than 4.1.

Example 80 provides the device according to any one of Examples 68-79, where the dielectric material has a k value lower than the k value of the substrate.

Example 81 provides the device according to any one of Examples 68-80, where the dielectric material has a porosity of between 0-60%.

Example 82 provides a device including a dielectric material disposed as a film on a substrate, the dielectric material including cross-linked cyclic carbosilane units having a ring structure including C and Si, where the cross-linked carbosilane units are capped with Si—H groups or Si—H$_2$ groups and where a thickness of the film varies less than 10 percent of the average thickness.

Example 83 provides the device according to Example 82, where the dielectric material includes a porous material with pore radius being between 1 and 10 nm.

Example 84 provides the device according to Example 83, where the pore radius varies less than 10-20 percent of the average pore radius.

Example 85 provides the device according to any one of Examples 82-84, where the dielectric material includes boron in concentration between 5 parts per billion and 1 percent of the mass of the dielectric material.

Example 86 provides the device according to any one of Examples 82-85, where adjacent cross-linked cyclic carbosilane units are linked via cyclic Si atoms in each cyclic carbosilane unit.

Example 87 provides the device according to any one of Examples 82-86, where the two adjoining cyclic carbosilane units are linked via an oxygen atom.

Example 88 provides the device according to any one of Examples 82-87, where all adjoining cyclic carbosilane units are linked via Si atoms in the carbosilane ring.

Example 89 provides the device according to any one of Examples 82-88, where the dielectric material exhibits a water uptake of less than or equal to 5.0%.

Example 90 provides a carbosilane-based device, the device including a dielectric material disposed as a film on a substrate or/and within a plurality of openings of the substrate, the dielectric material including cross-linked cyclic carbosilane units having a ring structure including C and Si, where at least a first cyclic carbosilane unit is linked to at least two adjacent cyclic carbosilane units and where the dielectric material includes boron in concentration between 5 parts per billion and 1 percent of the mass of the dielectric material.

Example 91 provides the device according to Example 90, where a thickness of the film varies less than 10 percent of the average thickness.

Example 92 provides the device according to Examples 90 or 91, where the dielectric material includes a porous material with pore radius being between 1 and 10 nm.

Example 93 provides the device according to Example 92, where the pore radius varies less than 10-20 percent of the average pore radius.

Example 94 provides a device including a dielectric material disposed as a film on a substrate or/and within a plurality of openings of the substrate, the dielectric material including cross-linked cyclic carbosilane units having a ring structure including C and Si, where the cross-linked carbosilane units are capped with Si—H groups or Si—$H_2$ groups and where the dielectric material includes boron in concentration between 5 parts per billion and 1 percent of the mass of the dielectric material.

Example 95 provides the device according to Example 94, where a thickness of the film varies less than 10 percent of the average thickness.

Example 96 provides the device according to Examples 94 or 95, where the dielectric material includes a porous material with pore radius being between 1 and 10 nm.

Example 97 provides the device according to Example 96, where the pore radius varies less than 10-20 percent of the average pore radius.

Further Examples provide integrated packages comprising a component, an interconnect region for providing electrical connectivity to the component, where the interconnect region includes a plurality of conductive regions, and one or more regions configured to electrically isolate at least some of the plurality of conductive regions, where the one or more regions may include any one of the dielectric materials described herein. In various Examples, the component may include a transistor, a die, a sensor, a processing device, or a memory device. Still further Examples provide computing devices that include such integrated circuit packages.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

The invention claimed is:

1. A carbosilane-based device, the device comprising:
    a substrate; and
    a dielectric material disposed as a film on the substrate, the dielectric material comprising cross-linked cyclic carbosilane units having a ring structure including C and Si, wherein at least a first cyclic carbosilane unit is linked to at least two adjacent cyclic carbosilane units, and wherein the dielectric material is further disposed as a film within a plurality of openings in the substrate, and wherein an individual opening of the plurality of openings has an aspect ratio between 1 and 20.

2. The device according to claim 1, wherein the dielectric material comprises a porous material with a pore radius between 1 nanometer and 10 nanometers.

3. The device according to claim 1, wherein a thickness of the film on the substrate varies less than 10 percent.

4. The device according to claim 1, wherein the dielectric material comprises boron having a concentration between 5 parts per billion and 1 percent of the mass of the dielectric material.

5. The device according to claim 1, wherein the first cyclic carbosilane unit is linked via Si—O—Si links to at least four separate cyclic carbosilane units.

6. The device according to claim 1, wherein the cyclic carbosilane units are free of Si—O-Et groups.

7. The device according to claim 1, wherein the dielectric material comprises two or more structurally distinct cyclic carbosilane units.

8. The device according to claim 2, wherein the pore radius varies less than 20 percent.

9. The device according to claim 2, wherein the pore radius varies less than 10 percent.

* * * * *